US012398737B2

(12) United States Patent
Williams

(10) Patent No.: US 12,398,737 B2
(45) Date of Patent: Aug. 26, 2025

(54) ELECTRO-FLUIDIC REMOTE DRIVE

(71) Applicant: PHD, Inc., Fort Wayne, IN (US)

(72) Inventor: Matthew R. Williams, Fort Wayne, IN (US)

(73) Assignee: PHD, Inc., Fort Wayne, IN (US)

( * ) Notice: Subject to any disclaimer, the term of this patent is extended or adjusted under 35 U.S.C. 154(b) by 0 days.

(21) Appl. No.: 18/494,021

(22) Filed: Oct. 25, 2023

(65) Prior Publication Data

US 2024/0141927 A1 May 2, 2024

Related U.S. Application Data

(60) Provisional application No. 63/419,934, filed on Oct. 27, 2022.

(51) Int. Cl.
*F15B 15/06* (2006.01)
*F15B 15/14* (2006.01)
*F15B 15/18* (2006.01)

(52) U.S. Cl.
CPC ........ *F15B 15/065* (2013.01); *F15B 15/1447* (2013.01); *F15B 15/18* (2013.01); *F15B 2215/30* (2013.01)

(58) Field of Classification Search
CPC ......... F15B 15/18; F15B 15/065; F01B 9/047
See application file for complete search history.

(56) References Cited

U.S. PATENT DOCUMENTS

2018/0080575 A1* 3/2018 Molinaro ............ F16K 31/1635

FOREIGN PATENT DOCUMENTS

| | | | |
|---|---|---|---|
| CN | 201159102 | Y | 12/2008 |
| CN | 207363838 | U | 5/2018 |
| CN | 211297196 | U | 8/2020 |
| JP | 2012-247040 | A | 12/2012 |
| JP | 2013133847 | A * | 7/2013 |
| KR | 20200028156 | A | 3/2020 |

OTHER PUBLICATIONS

Notification of Transmittal of the International Search Report and the Written Opinion of the International Searching Authority, or the Declaration dated Oct. 25, 2023 for International Application No. PCT/US2023/035915 (10 pages).

* cited by examiner

*Primary Examiner* — Abiy Teka
(74) *Attorney, Agent, or Firm* — TAYLOR & EDELSTEIN, PC

(57) ABSTRACT

A drive system includes: a remote drive configured for being driven by an electrical motor; and an actuator spaced apart from and fluidically coupled with the remote drive and configured for being fluidically powered by the remote drive.

12 Claims, 25 Drawing Sheets

ELECTRO-FLUIDIC REMOTE DRIVE

CROSS REFERENCE TO RELATED APPLICATIONS

This is a non-provisional application based upon U.S. provisional patent application Ser. No. 63/419,934, entitled "ELECTRO-FLUIDIC REMOTE DRIVE", filed Oct. 27, 2022, which is incorporated herein by reference.

BACKGROUND OF THE INVENTION

1. Field of the Invention

The present invention relates to robotics, and, more particularly, to systems for moving movable members of a robot.

2. Description of the Related Art

Actuators are devices characterized by one or more translating or rotating members (generally, movable members) which are moved relative to a stationary member by motive ways such as an electric motor or fluid driven piston. It is often desirable to minimize the mass of the actuator, especially in applications involving integration of the actuator as an end effector onto robots, where the mass of the actuator correspondingly reduces the mass of the workpiece that the robot can manipulate. Physically separating the components of the actuator responsible for moving and guiding the movable member from those components responsible for generating the motive force provides an effective way of reducing the mass that the robot must manipulate. Historically, in the prior art, this component separation has been accomplished by the use of fluid power transmission.

A pump or compressor, often located some distance away from the actuator, provides pressurized fluid through an appropriate network of valves, pipes, and flexible tubes to a piston that moves the movable member. Systems using such a centralized pump or compressor suffer from leaks along the length of the pipes and tubes used to convey the pressurized fluid from the pump or compressor to the actuator. Further, centralized electrically operated pumps or compressors also typically exhibit poor efficiency in converting electrical energy into compressed fluid. Further, such pumps and compressors often produce objectionable noise and heat that must be addressed. The loss of compressed fluid due to leaks, generally poor energy efficiency, and objectionable noise and heat of centralized pumps and compressors often necessitate the use of an electrical motor to directly convert electric current into motive force with the motor in close physical proximity to the actuator in order to achieve a desired efficiency of electric to translational or rotational motion conversion. Such configurations suffer the disadvantage of adding the relatively large mass of the motor to the total mass that a robot or machine must move when the actuator is used as an end effector.

What is needed in the art is a system for moving movable members with improved efficiency that at least partially overcomes the aforementioned disadvantages.

SUMMARY OF THE INVENTION

The present invention provides a drive system including a drive and an actuator, the drive being remotely located relative to the actuator.

The invention in one form is directed to a drive system which includes: a remote drive configured for being driven by an electrical motor; and an actuator spaced apart from and fluidically coupled with the remote drive and configured for being fluidically powered by the remote drive.

The invention in another form is directed to a drive of a drive system, the drive including: the drive, which is a remote drive that is configured for being driven by an electrical motor, is configured for being spaced apart and fluidically coupled with an actuator of the drive system, and is configured for fluidically powering the actuator.

The invention in yet another form is directed to a method of using a drive system, the method including the steps of: providing that the drive system includes a remote drive and an actuator, the remote drive being configured for being driven by an electrical motor, the actuator being spaced apart from and fluidically coupled with the remote drive; and fluidically powering the actuator by the remote drive.

An advantage of the present invention is that it provides an improved device to electrically drive a fluid powered actuator. Such an electro-fluidic drive is a remote drive (rather than a centralized drive, such as a centralized pump or compressor) that traverses the limitations discussed for the prior art by incorporating a way to physically separate components responsible for generating a motive fluid from the components responsible for generating the motion of a movable actuator member.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
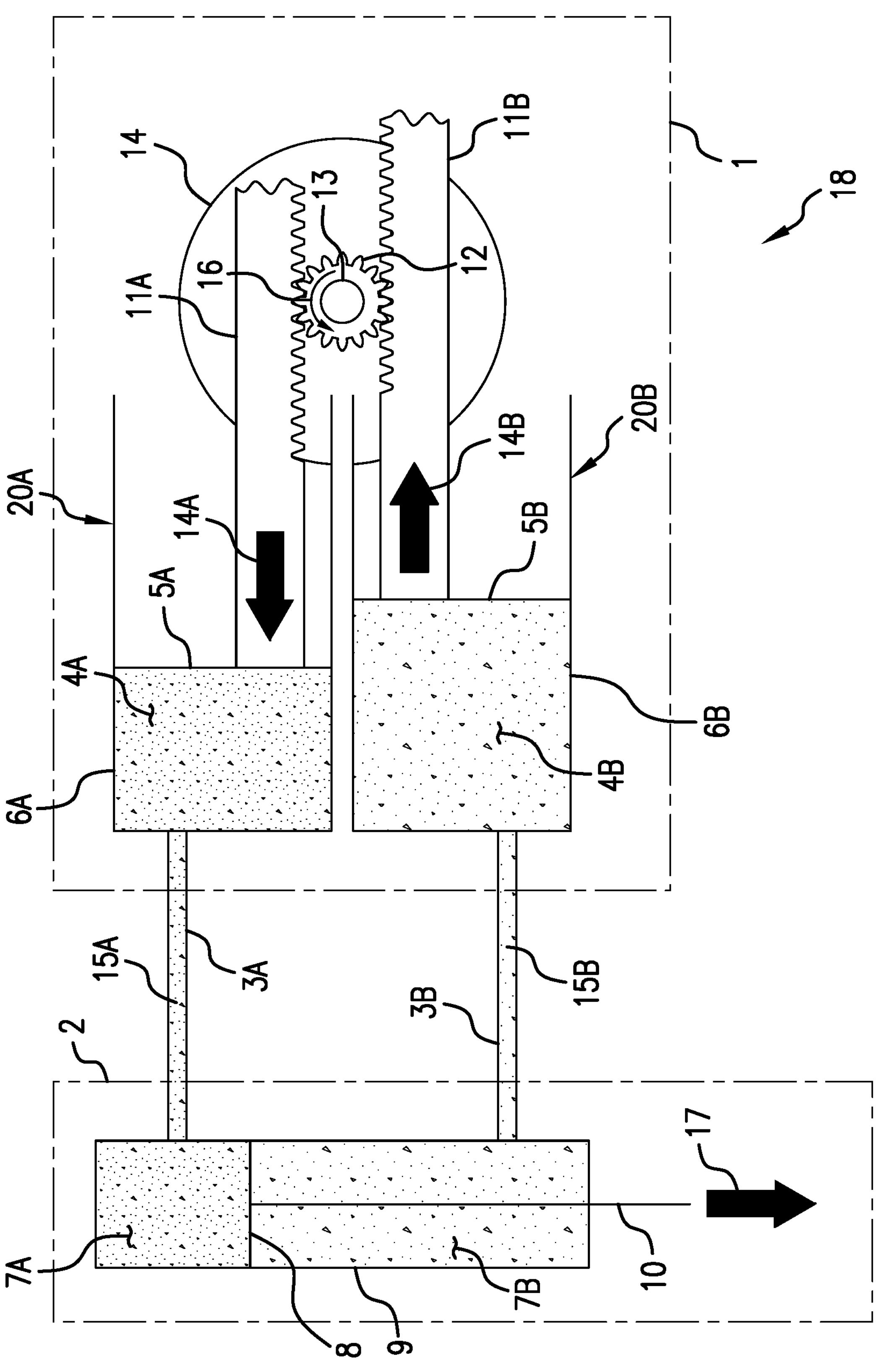
FIG. 1 shows a schematic of an embodiment of drive system including a remote drive and an actuator, in accordance with an exemplary embodiment of the present invention.

Referring to FIG. 1, there is shown a drive system 18, which includes each of the structures shown in FIG. 1. Drive system 18 includes an electrically powered motor 14, a remote drive 1 (remote drive 1 can be said to include motor 14), an actuator 2, and tubing 3A, 3B. Remote drive 1 is fluidically coupled to fluid-powered actuator 2, wherein remote drive 1 is configured for being driven by motor 14, and actuator 2 is spaced apart from and fluidically coupled with remote drive 1 and is configured for being fluidically powered by remote drive 1. Remote drive 1 additionally includes toothed racks 11A, 11B, pinion 12, cylinders 6A, 6B, and pistons 5A, 5B. Further, remote drive 1 includes a rack and pinion system 19 (which includes racks 11A, 11B and pinion 12) and piston assemblies 20A, 20B (which respectively includes piston 5A, cylinder 6A and piston 5A, cylinder 6B) which are coupled with rack and pinion system 19. Actuator 2 includes cylinder 9, piston 8, and rod 10. FIG. 1 shows that remote drive 1 is connected to a fluidically powered actuator 2 with tubing 3A and 3B so as to allow the actuator 2 to be physically separated from remote drive 1. Tubing 3A connects volume 4A formed by movable piston 5A and stationary cylinder 6A within remote drive 1 to volume 7A formed by movable piston 8 and stationary cylinder 9 of actuator 2. In an analogous manner, tubing 3B connects volume 4B formed by movable piston 5B and stationary cylinder 6B within remote drive 1 to volume 7B formed by movable piston 8 and stationary cylinder 9 of actuator 2. Rod 10, attached to piston 8, communicates (or, commutates) the translation of piston 8 within cylinder 9 to any device mechanically connected to actuator 2. Toothed racks 11A and 11B are mechanically attached to movable pistons 5A and 5B, respectively. Toothed pinion 12 engages racks 11A and 11B such that rotation of the pinion 12 causes a proportional translation of the racks 11A, 11B. The output shaft 13 of electrically powered motor 14 is mechanically coupled to pinion 12 so that the motor 14 can selectively rotate the pinion 12. Working fluid 15A fills the volume including remote drive volume 4A, the volume within connecting tubing 3A, and actuator volume 7A. In an analogous manner, working fluid 15B fills the volume including remote drive volume 4B, the volume within connecting tubing 3B, and actuator volume 7B. These connections between volumes 4A and 4B within remote drive 1 to corresponding volumes 7A and 7B, respectively, within actuator 2 create a fluidic way of communication between remote drive 1 and actuator 2. As motor 14 is activated to rotate pinion 12 in a counterclockwise (CCW) direction, as shown by arrow 16, rack 11A is driven to the left (in the direction of arrow 14A) by the engagement of pinion 12, simultaneously moving piston 5A to the left to reduce volume 4A, thereby forcing a quantity of working fluid 15A from remote drive 1 into actuator 2. The CCW rotation of pinion 12 causes a simultaneous translation rack 11B to the right, in the direction of arrow 14B, moving piston 5B to the right to increase volume 4B, thereby extracting a quantity of working fluid 15B from actuator 2 into remote drive 1. The action of working fluid 15A entering actuator volume 7A and working fluid 15B exhausting from actuator volume 7B exerts forces on actuator piston 8, this action acting to move piston 8 and attached rod 10 downward, in the direction shown by arrow 17. It will be apparent to one skilled in the art that rotation of pinion 12 by motor 14 in a clockwise (CW) direction will force working fluid 15B from remote drive volume 4B into actuator volume 7B while working fluid 15A from actuator volume 7A is exhausted into remote drive volume 4A, thereby moving actuator piston 8 and rod 10 upwards, opposite to the direction shown by arrow 17. In this manner, the rotation of motor shaft 13 is proportionally coupled to the translation of actuator rod 10. It will also be apparent that the working fluid 15A and 15B can be either a compressible gas, such as air, to create a pneumatically coupled system, or an incompressible liquid, such as water or oil, to create a hydraulically coupled system.

Referring now to FIGS. 2-12, there is shown another embodiment the drive system according to the present invention, namely, drive system 126, drive system 126 including another embodiment of the remote drive according to the present invention, namely, remote drive 100, and an actuator 127. Remote drive 100 includes motor 101, fasteners 102, body 103, jaw 104, spider 105, coupling 106, radial bearing 107, pinion 108, radial ball bearing 109, retaining ring 110, bearing washers 111A, 111B, threaded plugs 112A, 112B, racks 113A, 113B, piston assemblies 114, 115, cylinder tubes 116A, 116B, end cap 117, threaded ports 119A, 119B, tierods 120, 124, tierod nuts 121, 125, rack cover 122, and end cap 123. Piston assemblies 114, 115 include, respectively, pins 114A, 115A, inner pistons 114B, 115B, slots 114C, 115C, outer pistons 114D, 115D, O-rings 114E, 115E, and seals 114F, 115F. Further, remote drive 100 includes a rack and pinion system 128 that includes racks 113A, 113B and pinion 108, and piston assemblies 114, 115 are coupled with rack and pinion system 128. Inner pistons 114B, 115B and outer pistons 114D, 115D are configured for sliding relative to one another and thereby for selectively opening and closing a working medium passage 129 therebetween. In general, similar to drive system 18, motor 101 of remote drive 100 moves racks 113A, 113B via pinion 108, racks 113A, 113B moving piston assemblies 114, 115, causing a working fluid such as air to flow in or out of ports 119A, 119B, so as to move a working device thereby, such as an actuator similar to actuator 2. Thus, remote drive 100 uses air as a working fluid and incorporates rack and pinion system 128 to convert rotational motion from electric motor 101 into linear motion of pistons assemblies 114, 115 pneumatically coupled to a pneumatically driven actuator. This embodiment of the remote drive includes a provision (discussed below) to replenish the working fluid within the pneumatic circuit formed between the remote drive 100 and the driven actuator, some portion of which (the working fluid) may be lost through leakage each time the actuator is cycled. Remote drive 100 includes motor 101, which can be an alternating current or direct current motor, servomotor, gearmotor or servo-gearmotor, that is attached with mechanical fasteners 102 to body 103. The output shaft of motor 101 is rotationally coupled to pinion 108, through a commercially available shaft coupling, such as the Rotex series produced by KTR Corporation, which includes jaw 104, spider 105, and coupling 106. Pinion 108 is supported by radial ball bearings 107 and 109. Although radial ball bearings 107, 109 are shown, it will be understood by one skilled in the art that sintered metal or polymer bushings can be similarly used to support pinion 108. Retaining ring 110 retains bearing 109 within body 103. The teeth of pinion 108 engage complementary teeth in upper rack 113A and lower rack 113B, such that rotation of pinion 108 is converted into proportional translation of racks 113A, 113B. Bearing washers 111A and 111B support racks 113A and 113B, respectively, within body 103. Bearing washers 111A and 111B can be fabricated from suitable oil-filled sintered metal or polymer, such as the thrust bearing washers manufactured by Igus Corporation. Threaded plugs 112A and 112B bear against washers 111A and 111B, respectively, which are contained within complementary threaded bores in body 103. In this manner, washers 111A and 111B are constrained from radial movement by contact with the threaded bores in body 103, but are free to translate, under the action of plugs 112A and 112B so that racks 113A and 113B can be positioned about pinion 108 so as to align the pitch line of racks 113A, 113B with the pitch line of pinion 108. Pins 114A and 115A pass though complementary holes in racks 113A and 113B and complementary holes in inner pistons 114B and 115B to attach piston assemblies 114 and 115 to racks 113A and 113B, respectively. The ends of pins 114A and 115A engage slots 114C and 115C in outer piston 114D and 115D, respectively (see FIGS. 7 and 8), such that inner piston 114B/115 B is free to translate relative to outer piston 114D/115D within the extents of slots 114C/115C. O-ring 114E/115E is disposed in a complementary groove in inner piston 114B/115B to seal the periphery of inner piston 114B, 115B against the interior of outer piston 114D/115D when pin 114A/115A has translated to the extent of slot 114C/115C in the direction of seal 114F/115F. Seal 114F seals the periphery of outer piston 114D against the inner diameter of upper cylinder tube 116A. Seal 115F seals the periphery of outer piston 115D against the inner diameter of lower cylinder tube 116B. End cap 117 encloses and seals the ends of cylinder tubes 116A and 116B. The combination of piston assembly 114, tube 116A, and cap 117 form volume 118A, analogous to volume 4A formed in the remote drive of FIG. 1. The combination of piston assembly 115, tube 116B, and cap 117 form volume 118B, analogous to volume 4B formed in the remote drive of FIG. 1. Upper threaded port 119A in cap 117 allows for the establishment of a pneumatic connection between volume 118A and an external pneumatically driven actuator analogous to the connection between volumes 4A and 7A in the remote drive of FIG. 1. Lower threaded port 119B in cap 117 allows for the establishment of a pneumatic connection between volume 118B and an external pneumatically driven actuator analogous to the connection between volumes 4B and 7B in the remote drive of FIG. 1. One end of threaded tierods 120 thread into complementary holes in body 103. The opposing end of threaded tierods 120 pass through complementary holes in end cap 117 and are threaded into to tierod nuts 121 to retain cap 117 onto tubes 116A and 116B. Rack cover 122 abuts body 103 to protect the portion of racks 113A and 133B which protrude to the left of body 103. End cap 123 covers the opposing end of rack cover 122. One end of threaded tierods 124 thread into complementary holes in body 103. The opposing end of threaded tierods 124 pass through complementary holes in end cap 123 and are threaded into tierod nuts 125 to retain cap 123 onto cover 122.

Figure 9:
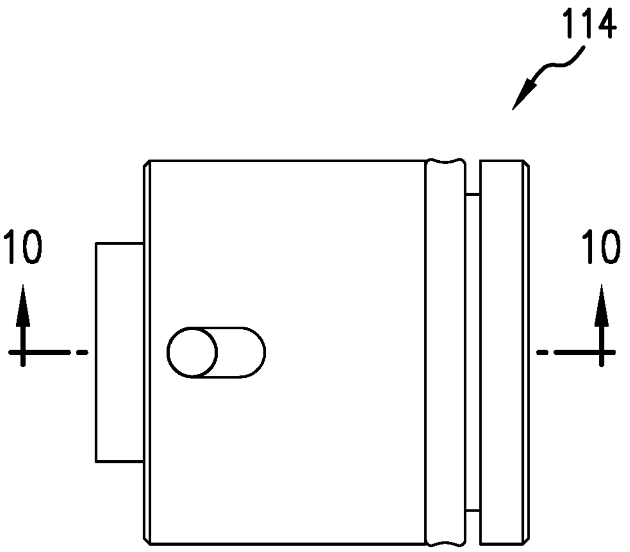
FIG. 9 shows top view of piston assembly 114 of the remote drive of FIG. 2.
Figure 10:
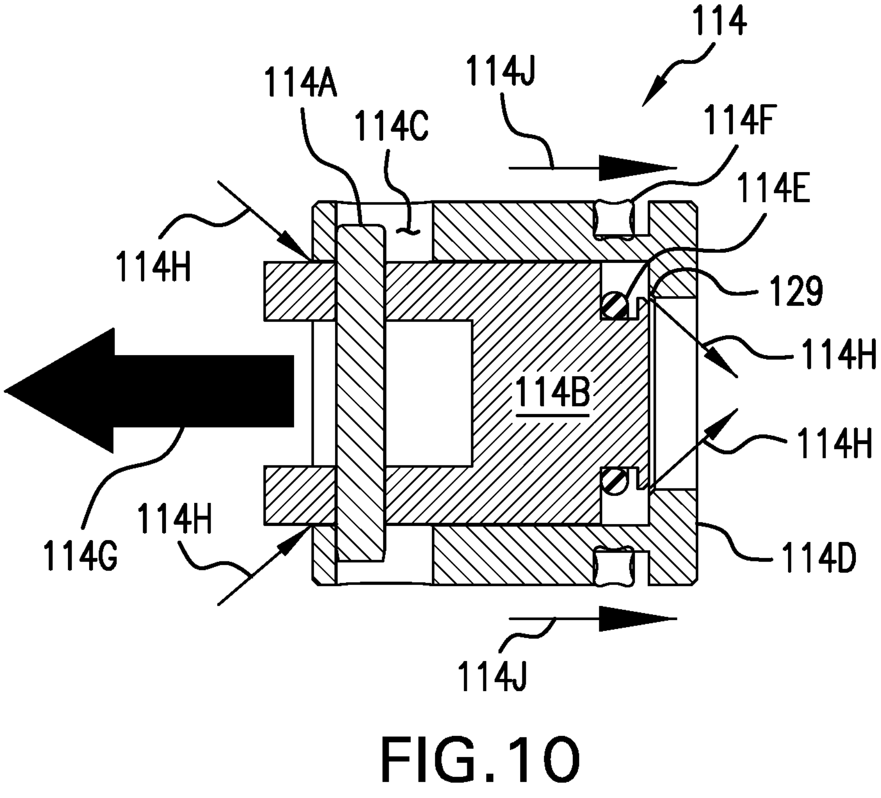
FIG. 10 shows a cross-sectional view of piston assembly 114 taken along line 10-10 in FIG. 9.

Referring now to FIGS. 9 and 10, movement of piston assembly 114, under the action of upper rack 113A moving in the direction of arrow 114G, causes a simultaneous translation of inner piston 114B, which is attached to rack 113A by pin 114A. Friction forces 114J, acting between compressed seal 114F and the inner diameter wall of tube 116A (see also FIG. 7), resist the translation of outer piston 114D, which results in a relative displacement of inner piston 114B with respect to outer piston 114D until pin 114A translates sufficiently to contact the left-most end of slot 114C. This relative displacement causes O-ring 114E to leave the confines of the smaller of the two concentric bores that pass through the entirety of outer piston 114D. The removal of O-ring seal 114E from the bore in outer piston 114D creates an annular passage around the seal 114E through which external air can flow, as indicated by arrows 114H, between the outer diameter of inner piston 114B and the inner diameter of outer piston 114D. In this manner, leftward translation of piston assembly 114 opens the annular passage between inner piston 114B and outer piston 114D, allowing external ambient air to pass into volume 118A to replenish any air that may have leaked from the pneumatic circuit formed by the pneumatic connection between volume 118A and an externally connected pneumatically driven actuator (not shown).

Figure 11:
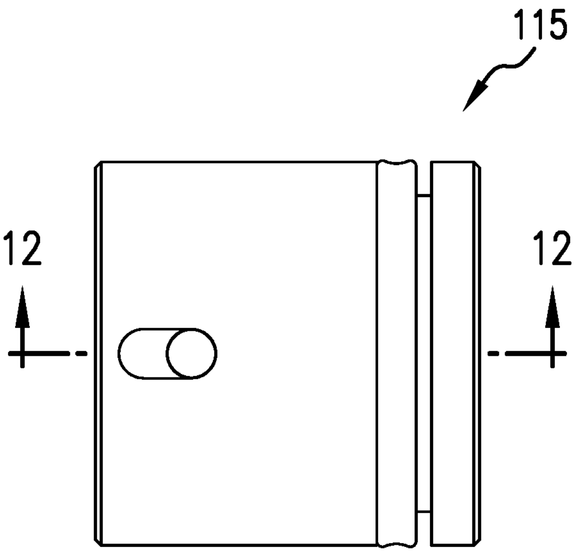
FIG. 11 shows top view of piston assembly 115 of the remote drive of FIG. 2.
Figure 12:
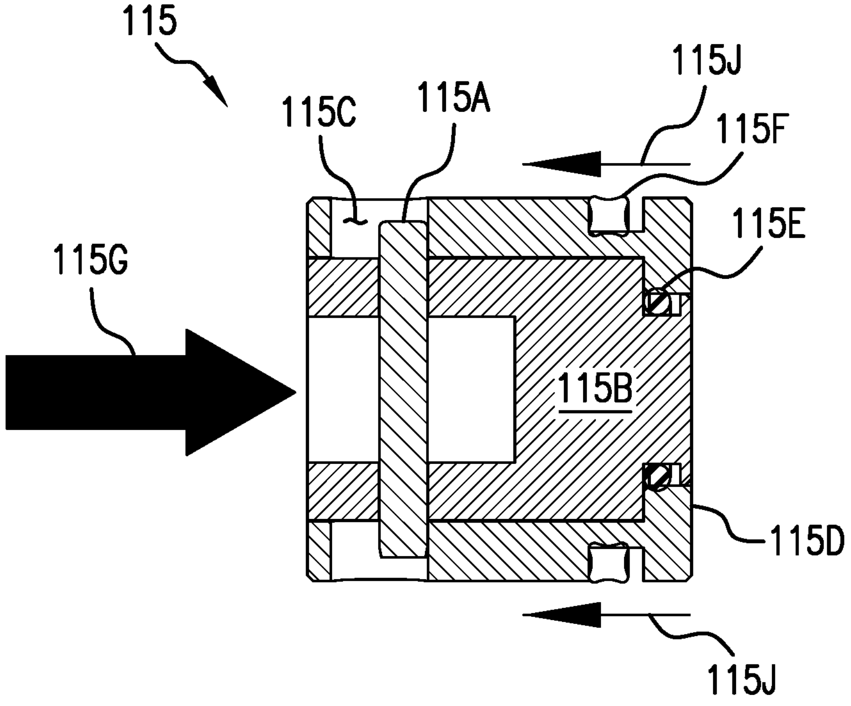
FIG. 12 shows a cross-sectional view of piston assembly 115 taken along line 12-12 in FIG. 11.
Figure 13:
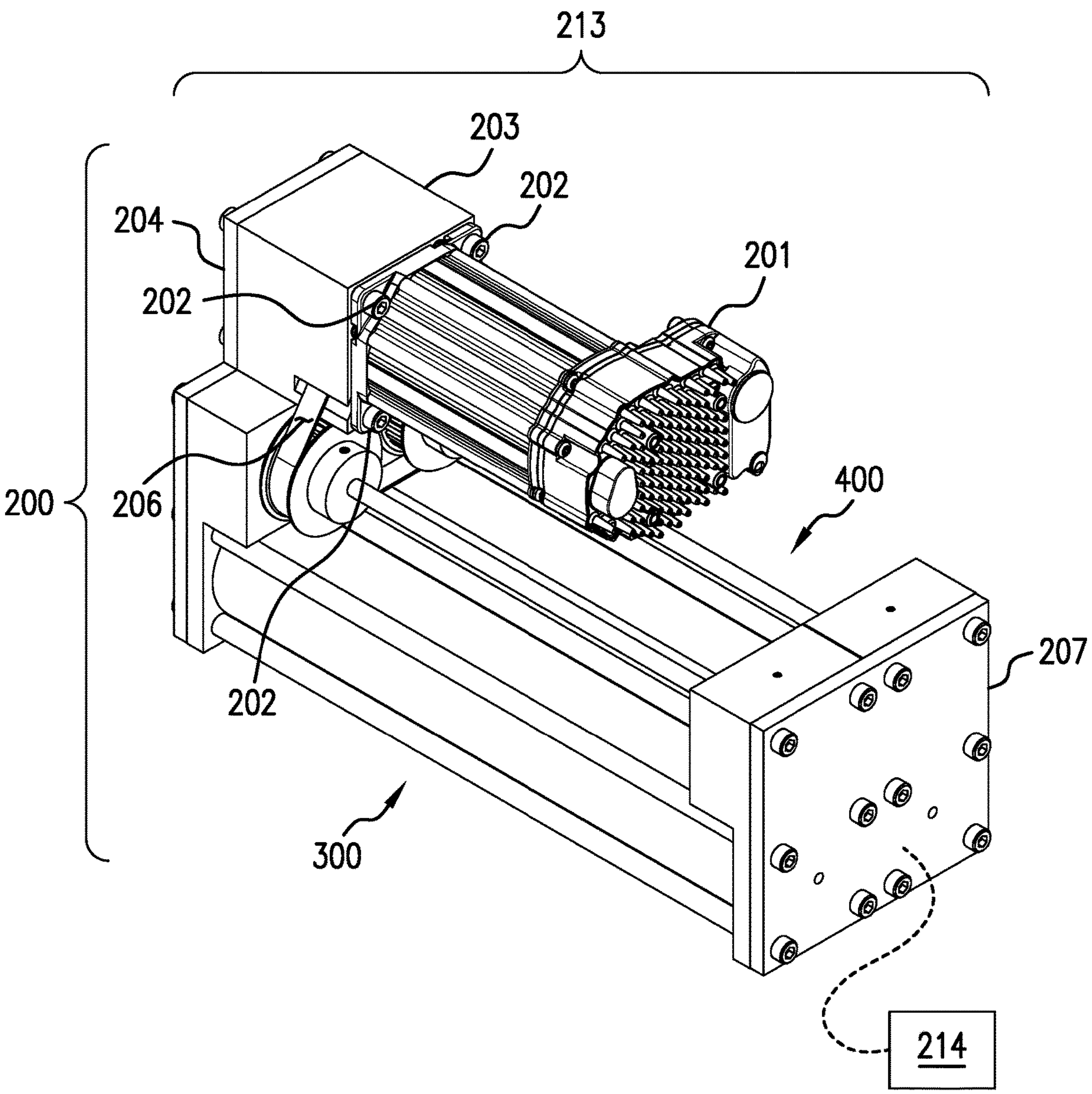
FIG. 13 shows an isometric view of yet another embodiment of a remote drive which uses air as the working fluid, in accordance with an exemplary embodiment of the present invention.

Referring now to FIGS. 11 and 12, the movement of piston assembly 115 is shown. Translation of piston assembly 115, under the action of lower rack 113B moving in the direction of arrow 115G, causes a simultaneous translation of inner piston 115B, which is attached to rack 113B by pin 115A. Friction forces 115J, acting between compressed seal 115F and the inner diameter wall of tube 116B (see also FIG. 7) resist the translation of outer piston 115D, which results in a relative displacement of inner piston 115B with respect to outer piston 114D until pin 114A translates sufficiently to contact the right-most end of slot 114C. This relative displacement causes O-ring 115E to enter the confines of the smaller of the two concentric bores that pass through the entirety of outer piston 115D, establishing the seal between inner and outer pistons 115B, 115D, to close the annular air passage through piston assembly 115. In this manner, rightward translation of piston assembly 115 closes the annular passage between inner piston 115B and outer piston 115D, preventing the exit of air within volume 118B to the external environment.

It will be apparent to one skilled in the art, that subsequent motion of piston assembly 114 in the direction opposite of arrow 114G will cause inner piston 114B to be displaced to the right relative to outer piston 114D so that O-ring 114E is caused to reenter the confines of the smaller bore through the outer piston 114D, reestablishing the seal between inner and outer pistons 114B, 114D, to close the annular air passage through piston assembly 114. Translation of piston assembly 114 in the direction opposite of arrow 114G will result in simultaneous translation of piston assembly 115 in the direction opposite of arrow 115G, causing a relative displacement of inner piston 115B with respect to outer piston 115D, removing O-ring seal 115E from the bore in outer piston 115D to create an annular passage around the seal 115E through which external air can flow, allowing external ambient air to pass into volume 118B to replenish any air that may have leaked from the pneumatic circuit formed by the pneumatic connection between volume 118B and an externally connected pneumatically driven actuator (not shown). In this manner, ambient external air is allowed to pass through piston assemblies 114 and 115, each time assemblies 114, 115 are translating in a direction which acts to expand the volumes 118A and 118B, respectively.

Referring now to FIGS. 13-18, there is shown another embodiment the drive system according to the present invention, namely, drive system 213, drive system 213 including another embodiment of the remote drive according to the present invention, namely, remote drive 200, and an actuator 214. Remote drive 200 includes motor 201, fasteners 202, 208, 209, 210, motor spacer 203, covers 204, 207, threaded ports 211A, 211B, 212A, 212B, pulleys 205, 206, cylinder assemblies 300, 400. Cylinder assemblies 300, 400 include, respectively, pulleys 301, 401, drive shafts 302, 402, radial bearings 303, 403, retaining rings 304, 404, blocks 305, 405, radial seals 306, 406, cable drums 307, 407, cables 308, 408, cable pulleys 309, 409, pivot pins 310, 410, seals 311, 411, cylinder tubes 312, 412, piston assemblies 313, 413, anchors 314, 414, seals 315, 415, retaining rings 316, 416, radial bearings 317, 417, tierods 318, 418, O-ring seals 319, 419, end blocks 320, 420, radial seals 321, 421, cable drums 322, 422, cables 323, 423, pulleys 324, 424, pivot pins 325, 425, anchors 326, 426, and seals 327, 427. Piston assemblies 313, 413, respectively, include cable pulleys 313A, 413A, inner pistons 313B, 413B, pivot pins 313C, 413C, cable pulleys 313D, 413D, pivot pins 313E, 413E, O-rings 313F, 413F, slots 313G, 413G, outer pistons 313H, 413H, seals 313J, 413J. Further, remote drive 200 includes a cable and pulley system 215, piston assemblies 313, 413 being coupled with cable and pulley system 215. Cable and pulley system 215 includes cables 308, 408, 323, 423 and pulleys 205, 206, 301, 401, 309, 409, 324, 424, 313A, 413A, 313D, 413D (structure overlapping between cable and pulley system 215 and piston assemblies 313, 413 (i.e., pulleys 313A, 413A, 313D, 413D) can be regarded as being a part of cable and pulley system 215 or piston assemblies 313, 413). Inner pistons 313B, 413B and outer pistons 313H, 413H are configured for sliding relative to one another and thereby for selectively opening and closing a working medium passage 129 therebetween (see FIGS. 9-12, for, the structure, function, and operation of working medium passage 129 of piston assemblies 313, 413 are substantially similar to those of working medium passage 129 of piston assemblies 114, 115). In general, similar to drive system 18, motor 201 of remote drive 200 moves belt 206, which rotates drive shafts 302, 402 and drums 307/407, 322/422, causing spans of cables 308/408 and 323/423 to lengthen or shorten, which causes piston assemblies 313, 413 to translate within respective tubes 312, 412, which causes air to flow in or out of ports 211A/211B, 212A/212B, so as to move a working device thereby, such as an actuator similar to actuator 2. Thus, remote drive 200 replaces the rack and pinion system of remote drives 1 and 100 with a cable and pulley system to convert the rotational motion from the electric motor into linear motion of piston assemblies 313, 413 fluidically coupled to a pneumatically driven actuator. Remote drive 200 includes motor 201, which can be an alternating current or direct current motor, servomotor, gearmotor or servo-gearmotor, that is attached with mechanical fasteners 202 to motor spacer 203. Timing belt pulley 205 is secured to the output shaft of motor 201 with setscrews (not shown). Timing belt 206 passes around timing belt pulley 205 and also around timing belt pulleys 301 and 401 so that rotation of the output shaft of motor 201 causes a simultaneous rotation of timing belt pulleys 301 and 401. Motor spacer 203 is attached to cover 204 with threaded fasteners 208. Cylinder assemblies 300 and 400 are attached on one end to cover 204 with threaded fasteners 209. The opposing ends of cylinder assemblies 300 and 400 are attached to cover 207 with threaded fasteners 210.

Figure 14:
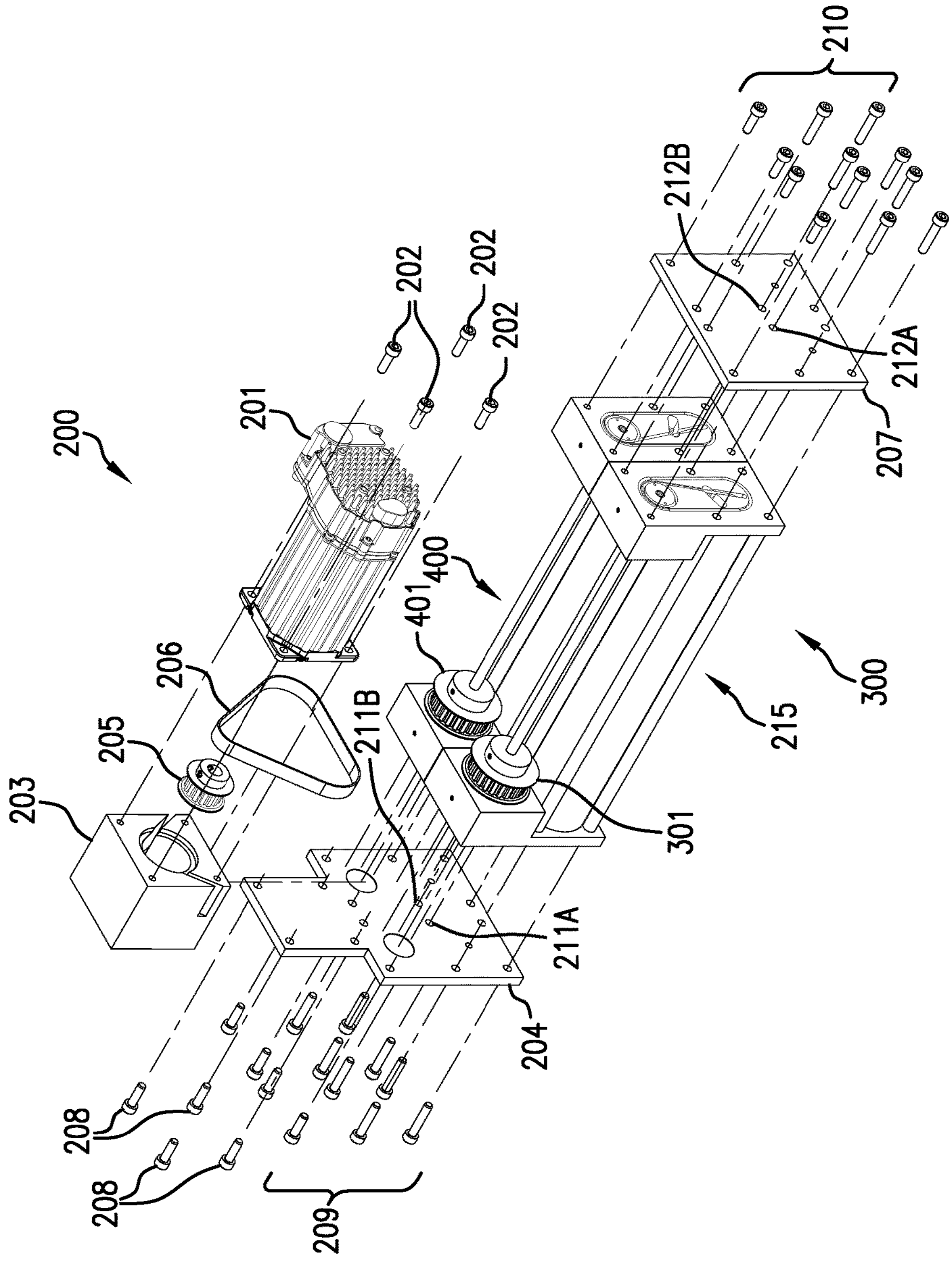
FIG. 14 shows a partially exploded isometric view of the remote drive of FIG. 13.
Figure 15:
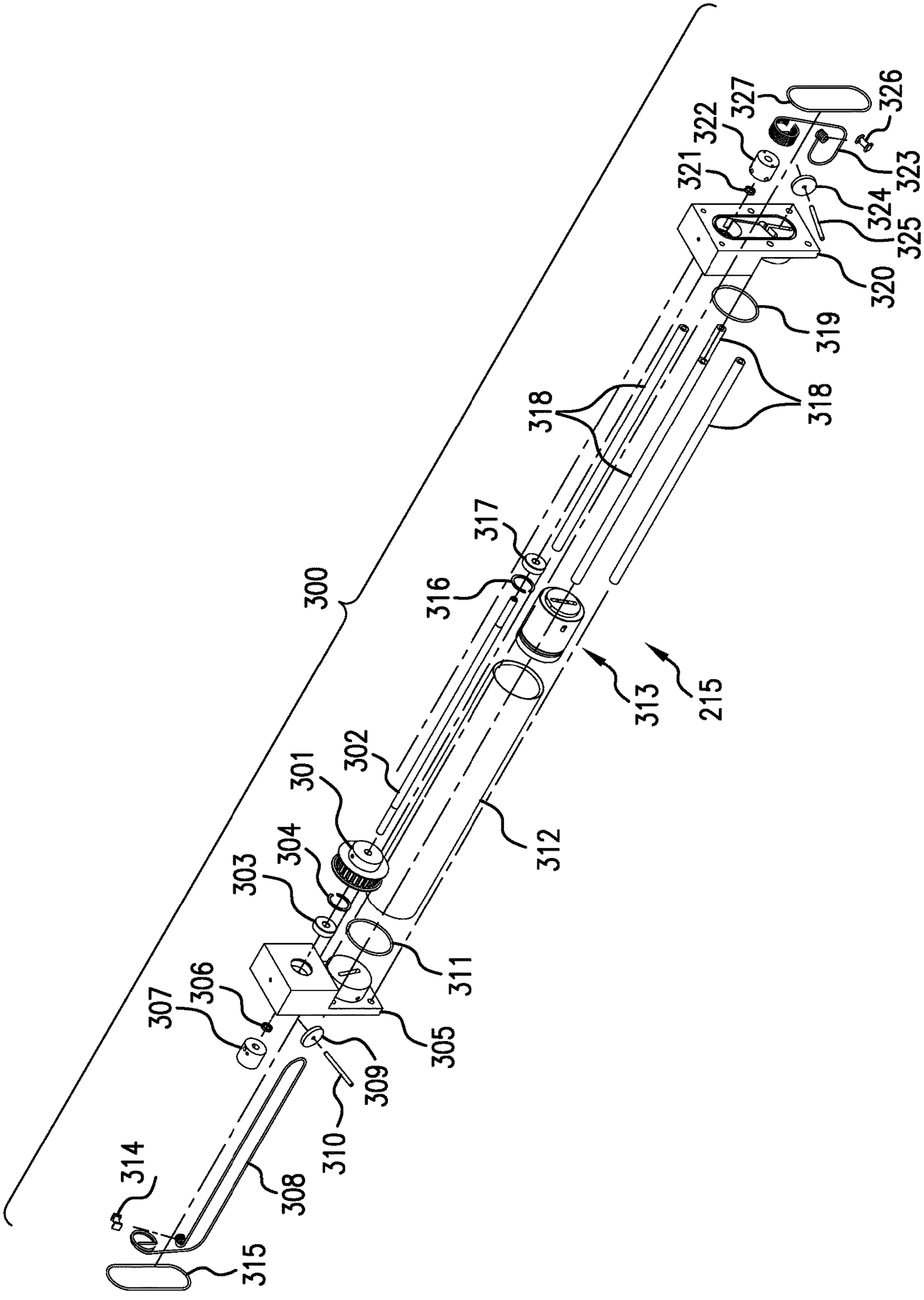
FIG. 15 shows an exploded isometric view of cylinder assembly 300 of FIG. 14.
Figure 16:
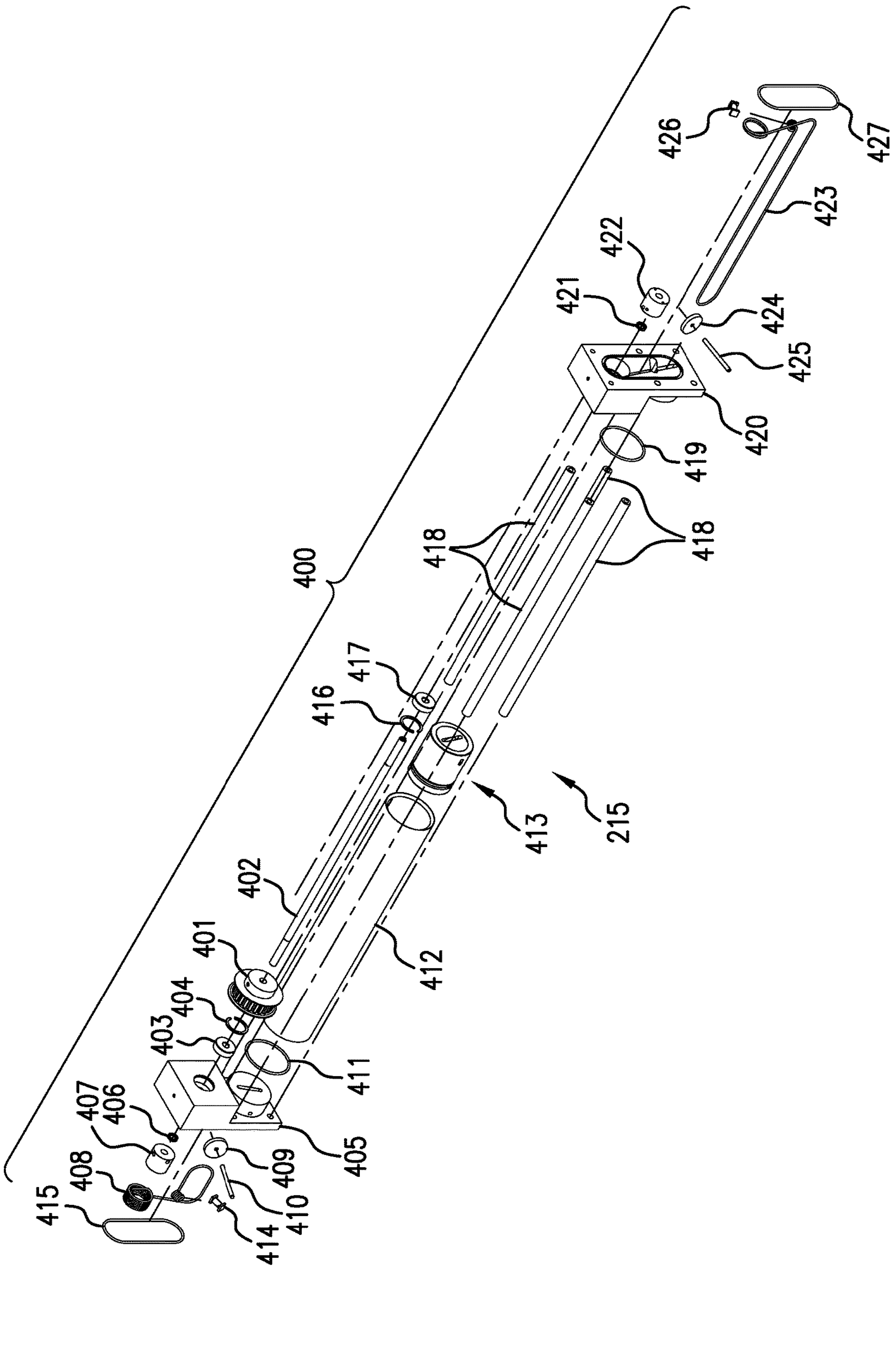
FIG. 16 shows an exploded isometric view of cylinder assembly 400 of FIG. 14.
Figure 17:
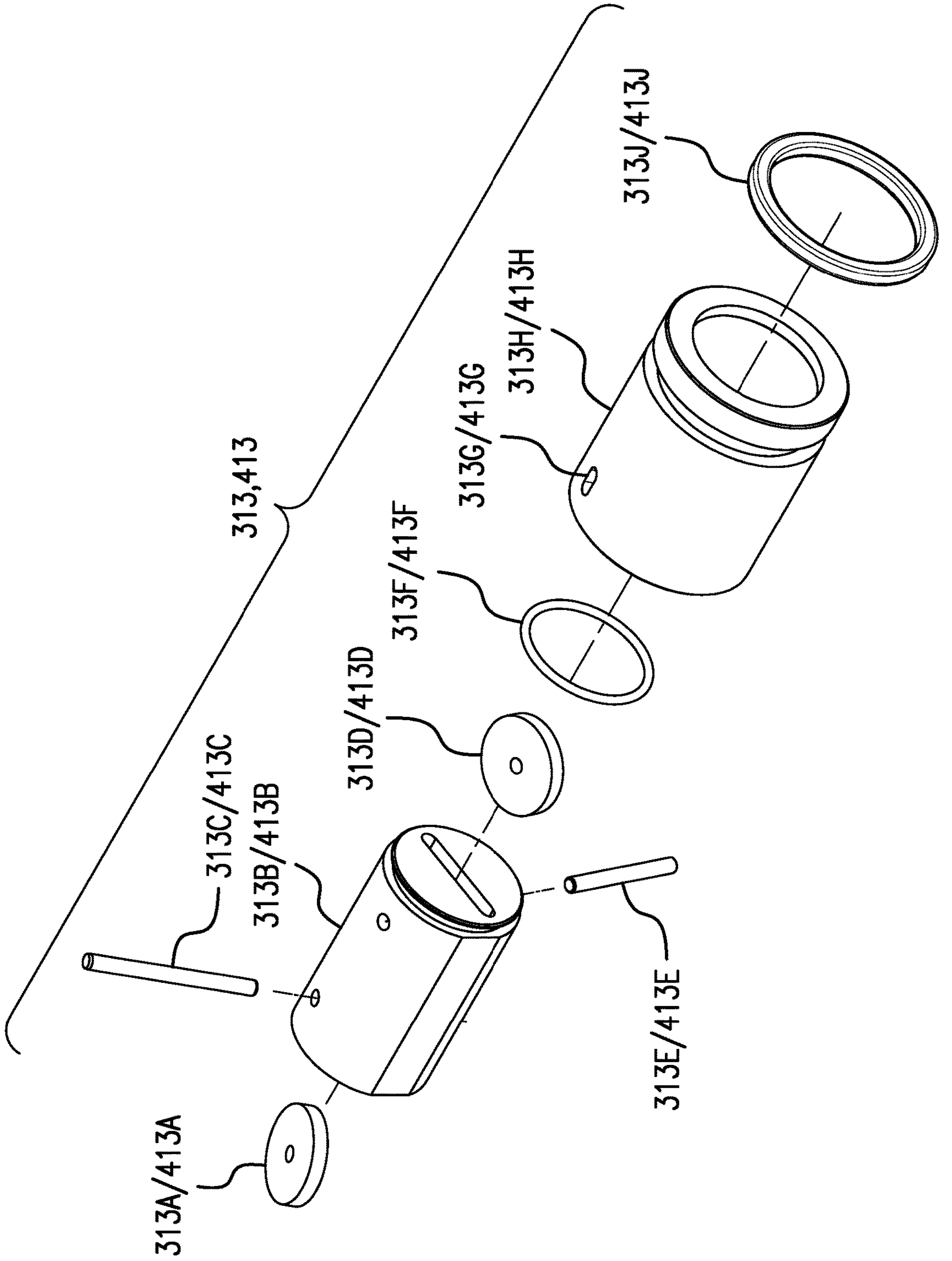
FIG. 17 shows an exploded view of piston assemblies 313/413 shown in FIGS. 15 and 16.

Referring now to FIGS. 15-17, timing belt pulley 301 is secured to drive shaft 302 with setscrews (not shown). One end of drive shaft 302 passes though radial bearing 303, with the bearing 303 retained by retaining ring 304 within a complementary bore in end block 305. The end of shaft 302 then passes through radial seal 306, disposed in a complementary bore in block 305 so as to prevent air from passing between shaft 302 and block 305, and into cable drum 307, with setscrews (not shown) securing the drum 307 onto the end of shaft 302. One end of cable 308 passes through a hole in drum 307, with a plurality of turns of cable 308 wound around the periphery of drum 307. Cable 308 may take the form of steel wire rope or be constructed from suitable polymer threads woven or braided together. Cable 308 is directed from the windings about drum 307 to wrap around the outer diameter of cable pulley 309, which is retained in a complementary slot in end block 305 by, and is free to pivot about, pivot pin 310 which is disposed in a complementary hole in the protruding boss of block 305. Cable 308 passes through block 305, O-ring seal 311 and cylinder tube 312 to engage cable pulley 313A, which is retained in a complementary slot in inner piston 313B by, and is free to pivot about, pivot pin 313C which is disposed in a complementary hole in inner piston 313B. O-ring seal 311 seals the end of tube 312 against the face of end block 305 to prevent the egress of compressed air from the end of tube 312. Cable 308 continues around the periphery of pulley 313A and returns through tube 312, seal 311, and block 305 to terminate with a plurality of turns of cable 308 wound around the periphery of capstan anchor 314 before passing through a complementary hole in anchor 314. Anchor 314 is disposed in a complementary groove in block 305 to prevent both rotation and translation of anchor 314. The turns of cable 308 about the body of anchor 314 exploit the so-called capstan effect, wherein any tension applied to cable 308 is progressively reduced by friction between the surface of cable 308 and the surface of anchor 314 as additional turns of cable 308 are added. This reduces the tension applied to cable 308 by the action of pulley 313A acting upon cable 308 to a level sufficient to retain the end of cable 308 within the hole in the anchor 314 through which cable 308 passes. In an analogous manner, the turns of cable 308 wound about cable drum 307 also exploits the capstan effect to retain the opposing end of cable 308 within the complementary cable 308 hole in drum 307. Seal 315 seals against the face of end cover 204 (see FIG. 14) to prevent the egress of compressed air from block 305 through other than threaded port 211A (see FIG. 14).

The opposing end of drive shaft 302 passes though radial bearing 317, with the bearing retained by retaining ring 316 within a complementary bore in end block 320. The end of shaft 302 then passes through radial seal 321, disposed in a complementary bore in block 320 so as to prevent air from passing between shaft 302 and block 320, and into cable drum 322, with setscrews (not shown) securing drum 322 onto the end of shaft 302. One end of cable 323 passes through a hole in drum 322, with a plurality of turns of cable 323 wound around the periphery of drum 322. Cable 323 may take the form of steel wire rope or be constructed from suitable polymer threads woven or braided together. Cable 323 is directed from the windings about drum 322 to wrap around the outer diameter of cable pulley 324, which is retained in a complementary slot in end block 320 by, and is free to pivot about, pivot pin 325 which is disposed in a complementary hole in the protruding boss of block 320. Cable 323 passes through block 320, O-ring seal 319 and cylinder tube 312 to engage cable pulley 313D, which is retained in a complementary slot in inner piston 313B by, and is free to pivot about, pivot pin 313E which is disposed in a complementary hole in inner piston 313B. The ends of pin 313C engage slot 313G in outer piston 313H, such that inner piston 313B is free to translate relative to outer piston 313H within the extents of slot 313G. O-ring 313F is disposed in a complementary groove in inner piston 313B to seal the periphery of inner piston 313B against the interior of outer piston 313H when the pin 313C has translated to the extent of slot 313G in the direction of seal 313F. Seal 313F seals the periphery of outer piston 313H against the inner diameter of cylinder tube 312. O-ring seal 319 seals the opposing end of tube 312 against the face of end block 320 to prevent the egress of compressed air from the end of the tube. Cable 323 continues around the periphery of pulley 313D and returns through tube 312, seal 319, and block 320 to terminate with a plurality of turns of cable 323 wound around the periphery of capstan anchor 326 before passing through a complementary hole in anchor 326. Anchor 326 is disposed in a complementary groove in block 320 to prevent both rotation and translation of anchor 326. The turns of cable 323 about anchor 326 and drum 322 exploit the capstan effect to allow the complementary cable holes in the anchor and drum to retain the respective ends of cable 323. Seal 327 seals against the face of end cover 207 (FIG. 14) to prevent the ingress of external ambient air into block 320 through other than threaded port 212A (FIG. 14). Tierods 318 surround tube 312 to mechanically join together end blocks 305 and 320.

Referring now to FIGS. 16 and 17, timing belt pulley 401 is secured to drive shaft 402 with setscrews (not shown). One end of drive shaft 402 passes though radial bearing 403, with the bearing retained by retaining ring 404 within a complementary bore in end block 405. The end of shaft 402 then passes through radial seal 406, disposed in a complementary bore in block 405 so as to prevent air from passing between the shaft and block, and into cable drum 407, with setscrews (not shown) securing drum 407 onto the end of shaft 402. One end of cable 408 passes through a hole in drum 407, with a plurality of turns of cable 408 wound around the periphery of drum 407. Cable 408 may take the form of steel wire rope or be constructed from suitable polymer threads woven or braided together. Cable 408 is directed from the windings about drum 407 to wrap around the outer diameter of cable pulley 409, which is retained in a complementary slot in end block 405 by, and is free to pivot about, pivot pin 410 which is disposed in a complementary hole in the protruding boss of block 405. Cable 408 passes through block 405, O-ring seal 411 and cylinder tube 412 to engage cable pulley 413A, which is retained in a complementary slot in inner piston 413B by, and is free to pivot about, pivot pin 413C which is disposed in a complementary hole in inner piston 413B. The ends of pin 413C engage slot 413G in outer piston 413H, such that inner piston 413B is free to translate relative to outer piston 413H within the extents of slot 413G. O-ring 413F is disposed in a complementary groove in inner piston 413B to seal the periphery of inner piston 413B against the interior of outer piston 413H when the pin 413C has translated to the extent of slot 413G in the direction of seal 413F. O-ring seal 411 seals the end of tube 412 against the face of end block 405 to prevent the egress of compressed air from the end of tube 412. Cable 408 continues around the periphery of pulley 413A and returns through tube 412, seal 411, and block 405 to terminate with a plurality of turns of cable 408 wound around the periphery of capstan anchor 414 before passing through a complementary hole in anchor 414. Anchor 414 is disposed in a complementary groove in block 405 to prevent both rotation and translation of anchor 414. The turns of cable 408 about the body of anchor 414 exploit the so-called capstan effect, wherein any tension applied to cable 408 is progressively reduced by friction between the surface of cable 408 and the surface of anchor 414 as additional turns of cable 408 are added. This reduces the tension applied to cable 408 by the action of pulley 413A acting upon cable 408 to a level sufficient to retain the end of cable 408 within the hole in anchor 414 through which cable 408 passes. In an analogous manner, the turns of cable 408 wound about cable drum 407 also exploit the capstan effect to retain the opposing end of cable 408 within the complementary cable hole in drum 407. Seal 415 seals against the face of end cover 204 (FIG. 14) to prevent the egress of compressed air from the block 405 through other than threaded port 211B (FIG. 14).

The opposing end of drive shaft 402 passes though radial bearing 417, with the bearing retained by retaining ring 416 within a complementary bore in end block 420. The end of shaft 402 then passes through radial seal 421, disposed in a complementary bore in block 420 so as to prevent air from passing between the shaft and block, and into cable drum 422, with setscrews (not shown) securing drum 422 onto the end of shaft 402. One end of cable 423 passes through a hole in drum 422, with a plurality of turns of cable 423 wound around the periphery of drum 422. Cable 423 may take the form of steel wire rope or be constructed from suitable polymer threads woven or braided together. Cable 423 is directed from the windings about drum 422 to wrap around the outer diameter of cable pulley 424, which is retained in a complementary slot in end block 420 by, and is free to pivot about, pivot pin 425 which is disposed in a complementary hole in the protruding boss of block 420. Cable 423 passes through block 420, O-ring seal 419 and cylinder tube 412 to engage cable pulley 413D, which is retained in a complementary slot in inner piston 413B by, and is free to pivot about, pivot pin 413E which is disposed in a complementary hole in inner piston 413B. O-ring seal 419 seals the opposing end of tube 412 against the face of end block 420 to prevent the egress of compressed air from the end of the tube. Cable 423 continues around the periphery of pulley 413D and returns through tube 412, seal 419, and block 420 to terminate with a plurality of turns of cable 423 wound around the periphery of capstan anchor 426 before passing through a complementary hole in anchor 426. Anchor 426 is disposed in a complementary groove in block 420 to prevent both rotation and translation of anchor 426. The turns of cable 423 about anchor 426 and drum 422 exploit the capstan effect to allow the complementary cable holes in anchor 426 and drum 422 to retain the respective ends of cable 423. Seal 427 seals against the face of end cover 207 (see FIG. 14) to prevent the ingress of external ambient air into block 320 through other than threaded port 212B (see FIG. 14). Tierods 418 surround tube 412 to mechanically join together end blocks 405 and 420.

Figure 2:
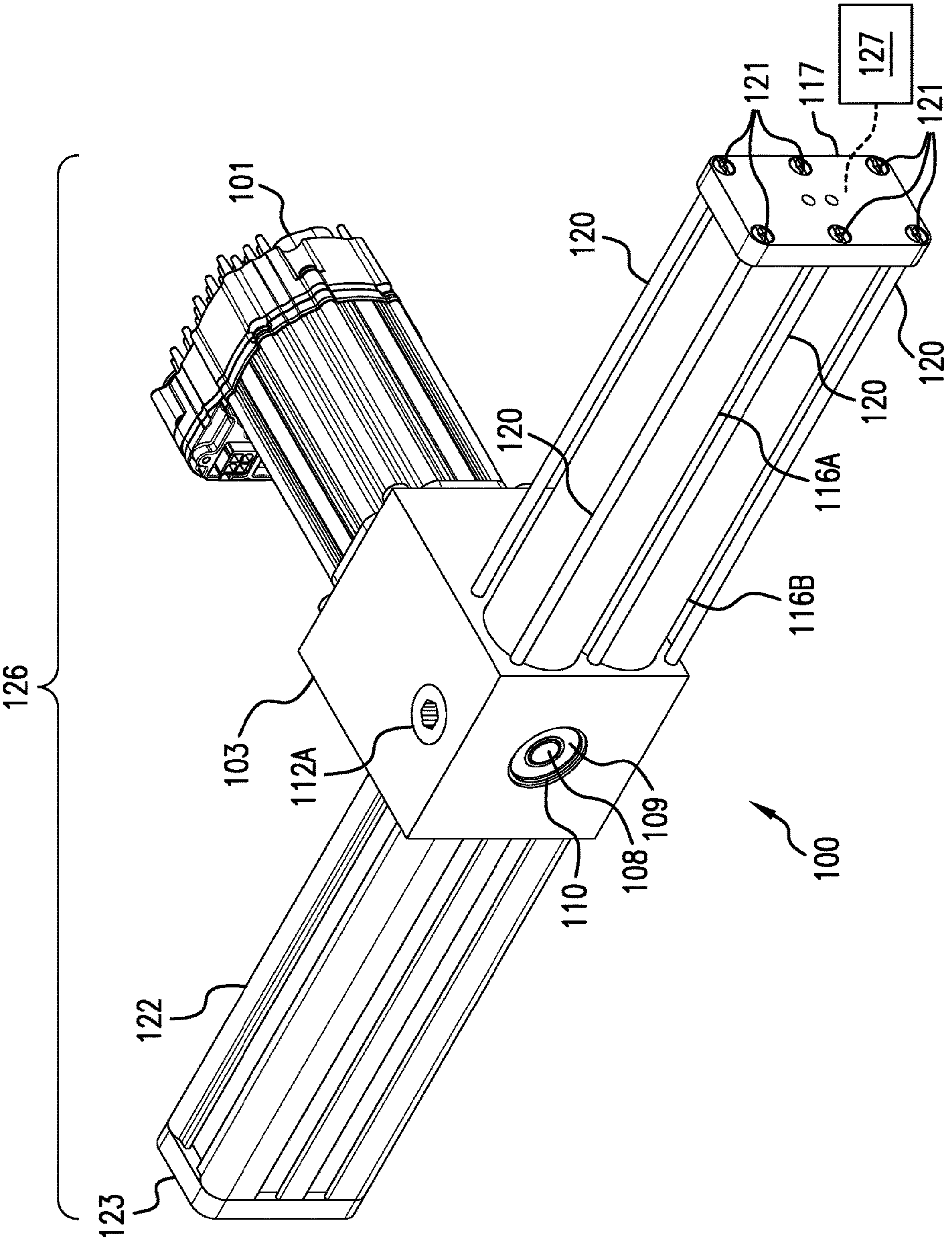
FIG. 2 shows an isometric view of another embodiment of a remote drive which uses air as the working fluid, in accordance with an exemplary embodiment of the present invention.
Figure 3:
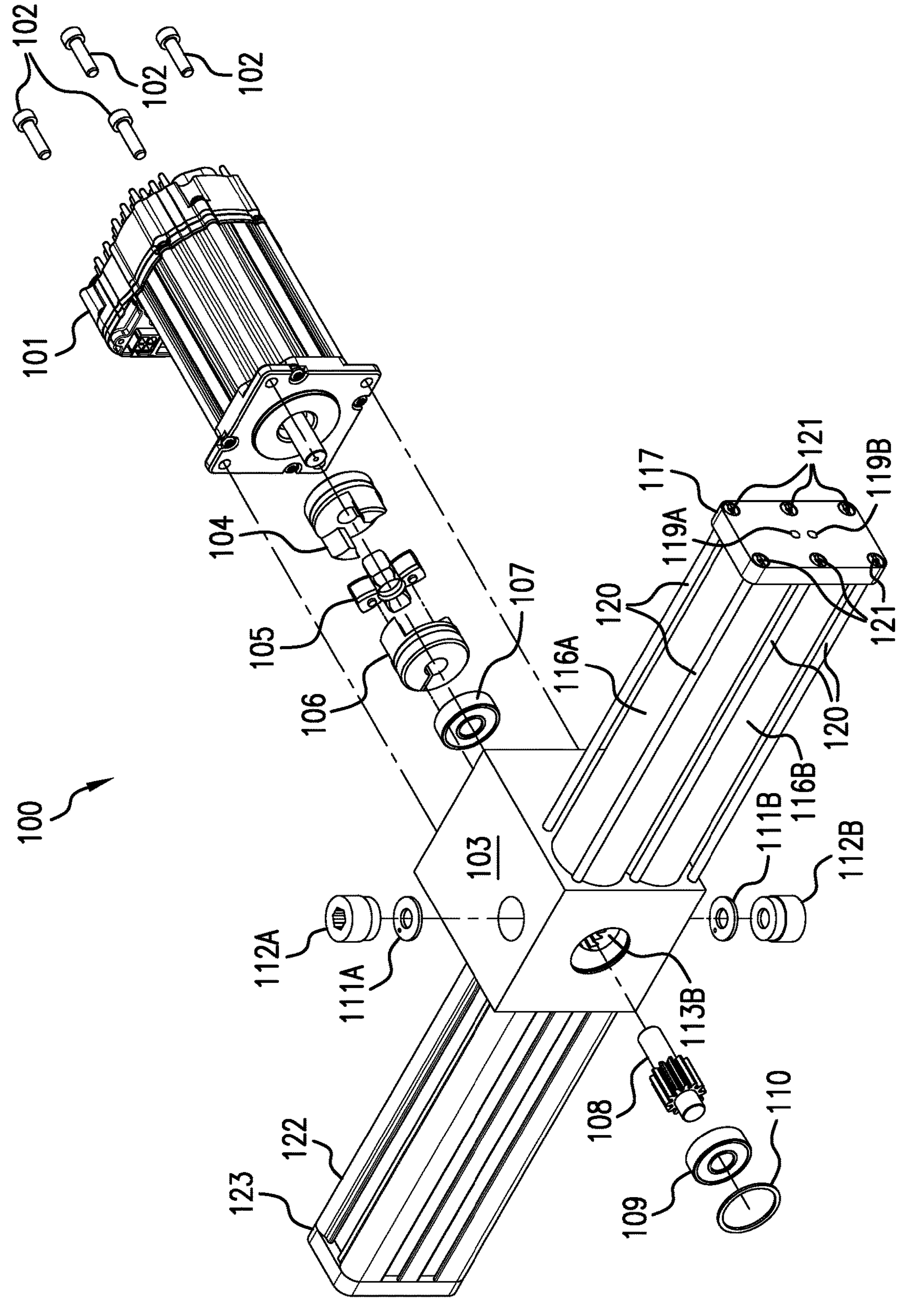
FIGS. 3, 4, and 5 show partially exploded isometric views of the remote drive of FIG. 2.
Figure 4:
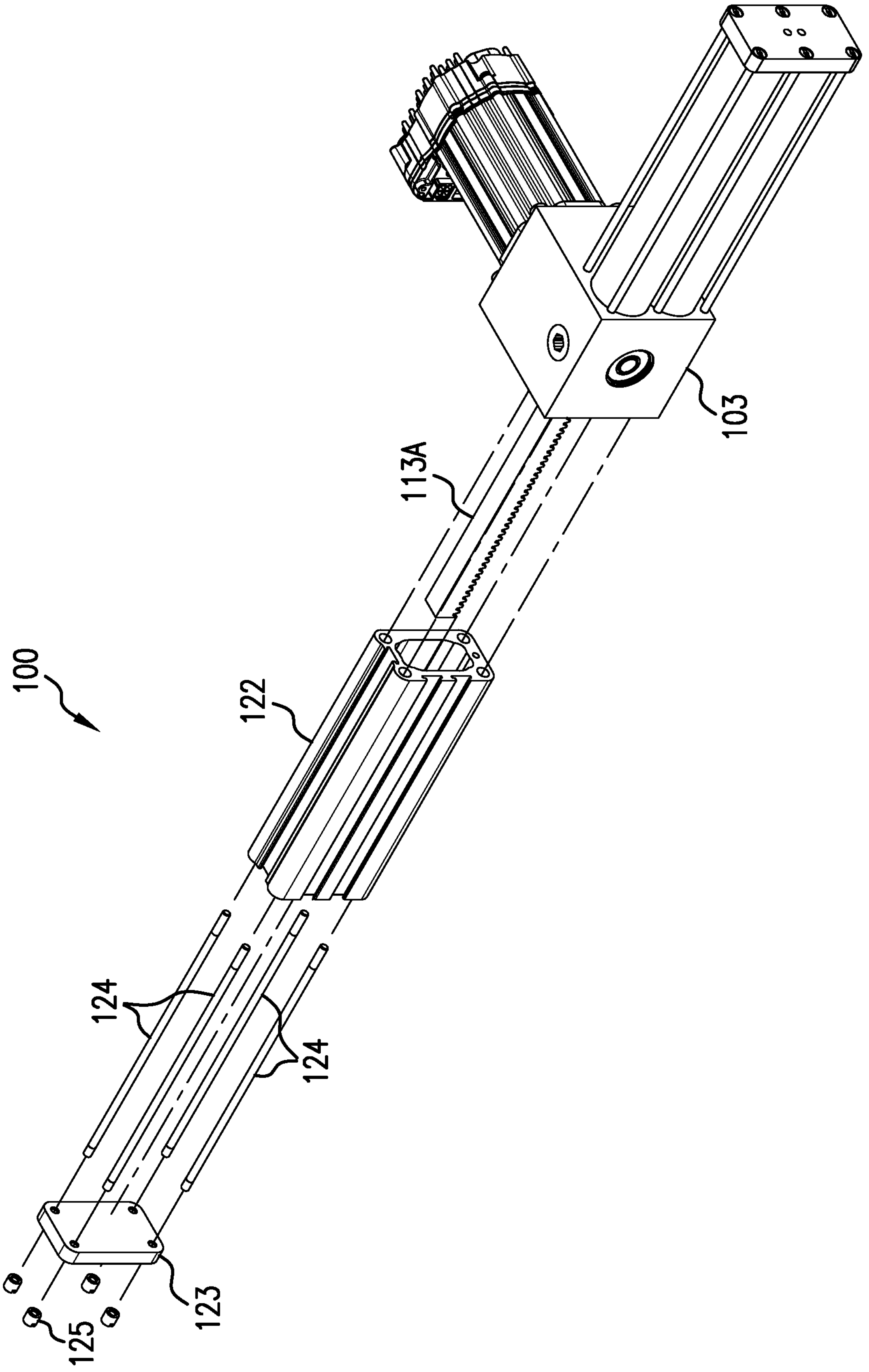
Figure 5:
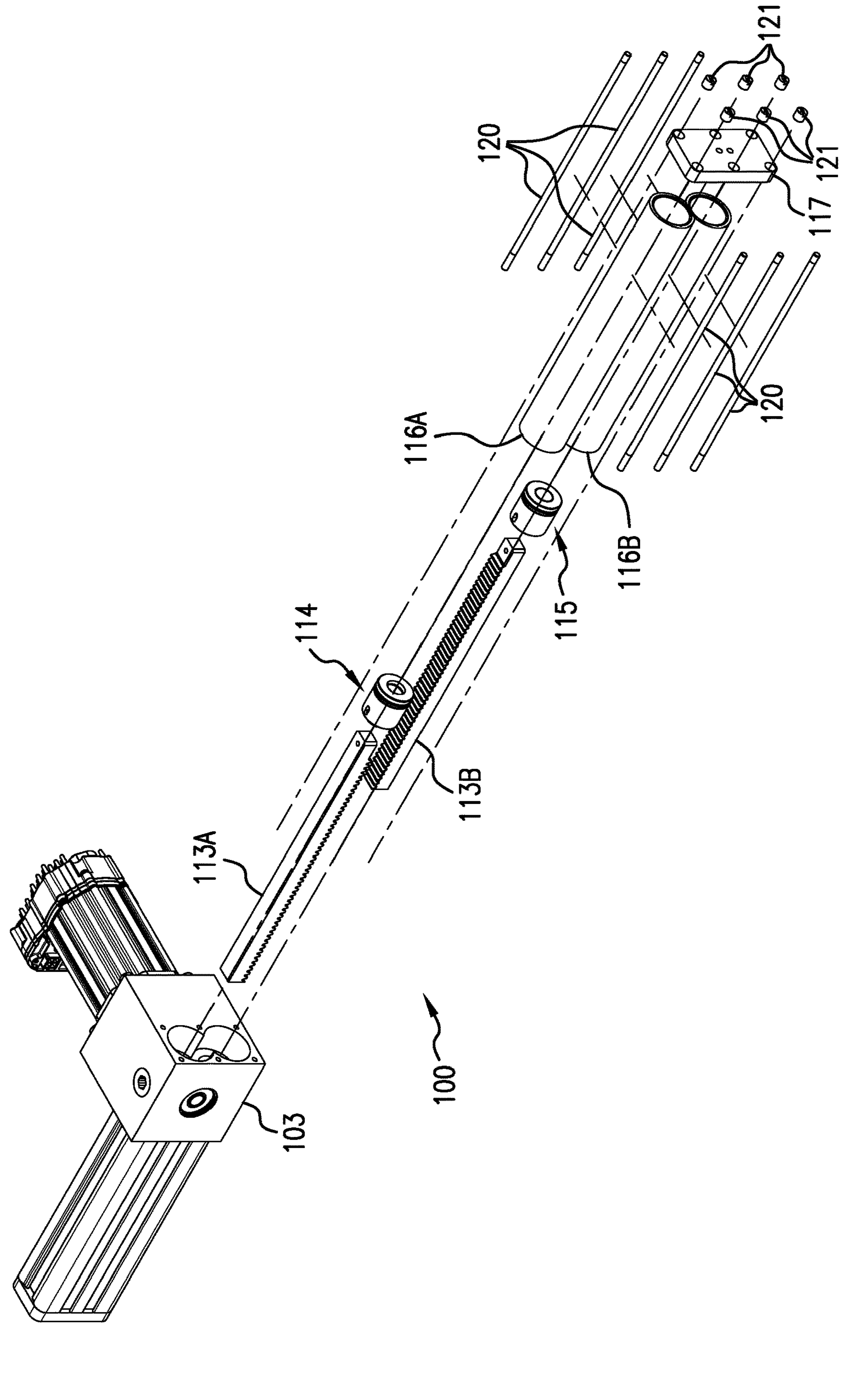
Figure 6:
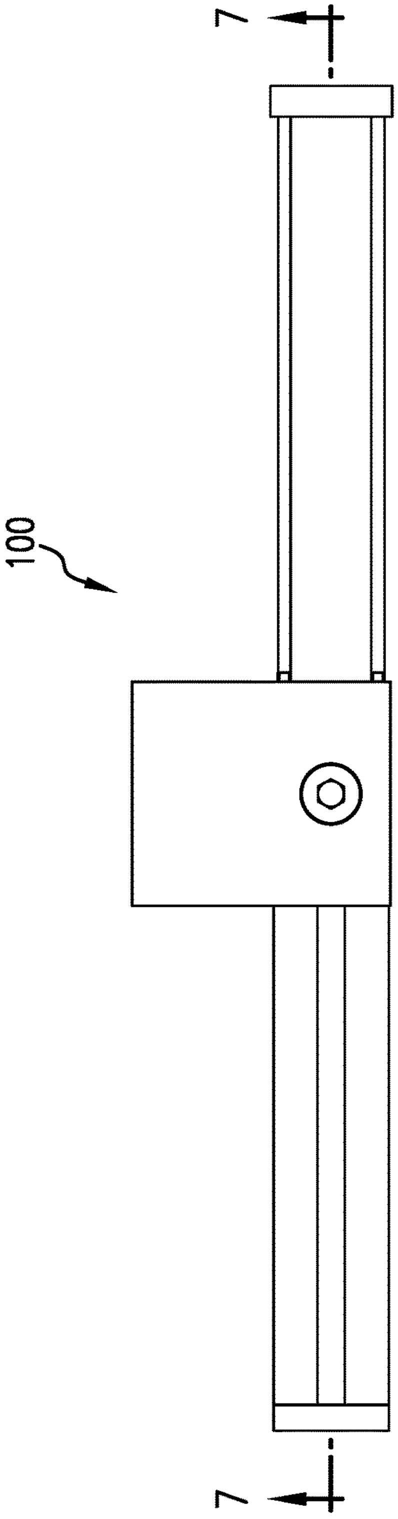
FIG. 6 shows a top view of the remote drive of FIG. 2.
Figure 7:
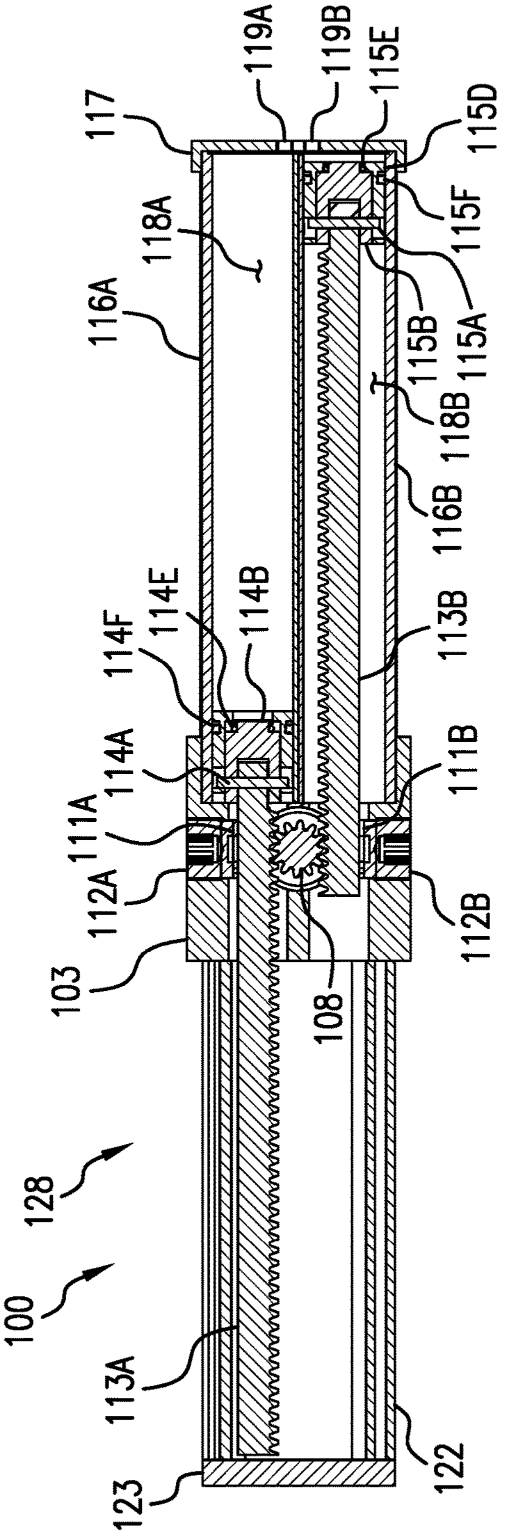
FIG. 7 shows a cross-sectional view of the remote drive taken along line 7-7 in FIG. 6.
Figure 8:
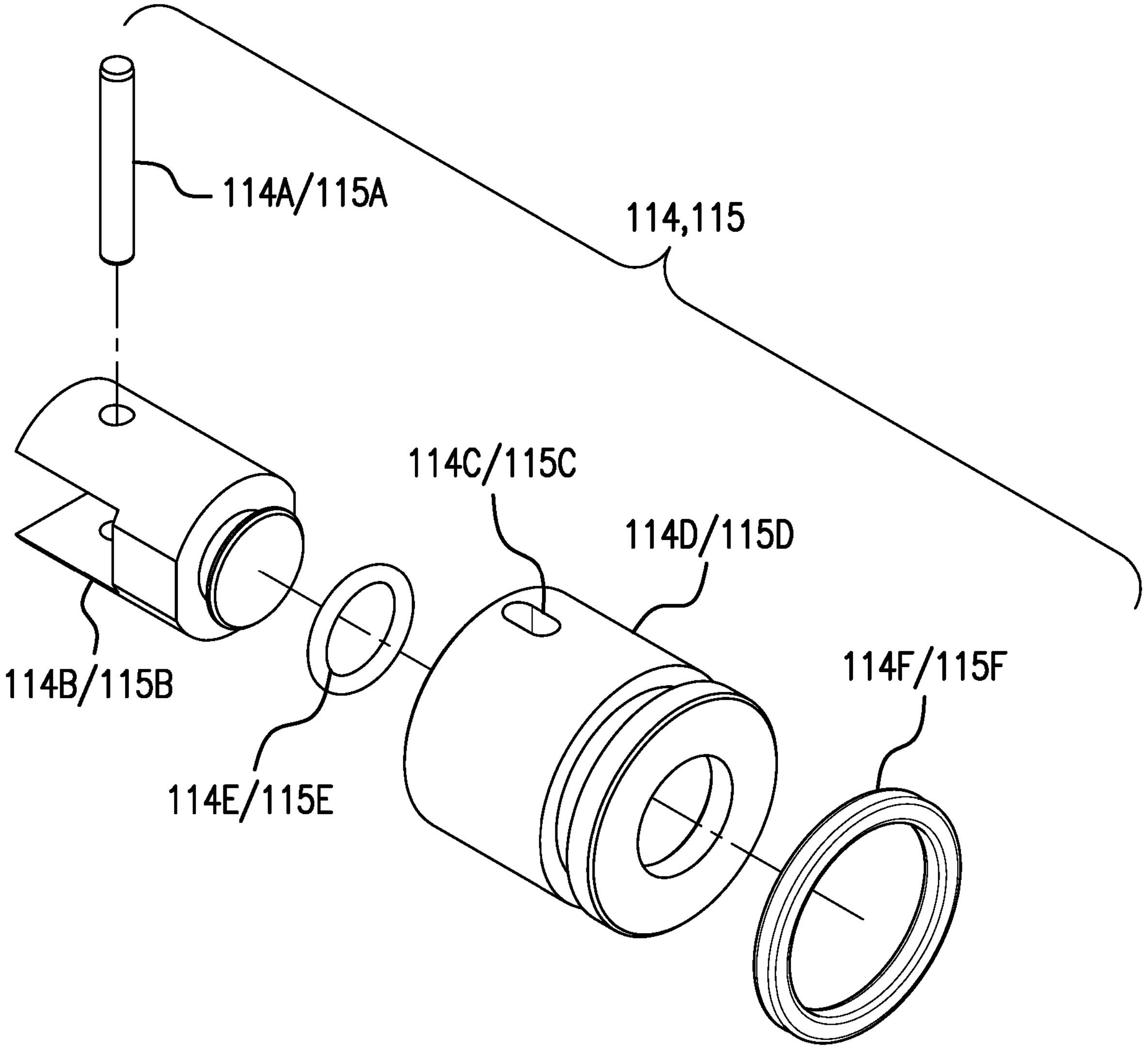
FIG. 8 shows an exploded view of piston assemblies 114/115 shown in FIGS. 5 and 7.

Operation of piston assemblies 313 and 413 is analogous to the operation of piston assemblies of 114 and 115 in the remote drive of FIG. 2. As piston assembly 313 moves directionally toward end cover 204, the volume of air enclosed by block 305, tube 312, and piston assembly 313 is reduced, forcing the enclosed air through port 211A. Simultaneously with air exiting through port 211A, air flows through port 212A, to fill the partial vacuum which is created as the volume of air enclosed by block 320, tube 312, and piston assembly 313 is increased. As piston assembly 313 moves directionally away from end cover 204, the volume of air enclosed by block 305, tube 312, and piston assembly 313 is increased, with the friction exerted by seal 313J acting against the inner wall of tube 312 causing inner piston 313B to translate relative to outer piston 313H. Such translation opens the annular passage between inner piston 313B and outer piston 313H, allowing external ambient air to pass into the volume enclosed by block 305, tube 312, and piston assembly 313, so as to replenish any air that may have leaked from the pneumatic circuit formed by the pneumatic connection between the volume enclosed by block 305, tube 312, and piston assembly 313 and an externally connected pneumatically driven actuator (not shown). Analogously, as piston assembly 413 moves directionally toward end cover 204, the volume of air enclosed by block 405, tube 412, and piston assembly 413 is reduced, forcing the enclosed air through port 211B. Simultaneously with air exiting through port 211B, air flows through port 212B, to fill the partial vacuum which is created as the volume of air enclosed by block 420, tube 412, and piston assembly 413 is increased. As piston assembly 413 moves directionally away from end cover 204, the volume of air enclosed by block 405, tube 412, and piston assembly 413 is increased, with the friction exerted by seal 413J acting against the inner wall of tube 412 causing inner piston 413B to translate relative to outer piston 413H. Such translation opens the annular passage between inner piston 413B and outer piston 413H, allowing external ambient air to pass into the volume enclosed by block 405, tube 412, and piston assembly 413, so as to replenish any air that may have leaked from the pneumatic circuit formed by the pneumatic connection between the volume enclosed by block 405, tube 412, and piston assembly 413 and an externally connected pneumatically driven actuator (not shown).

Figure 18:
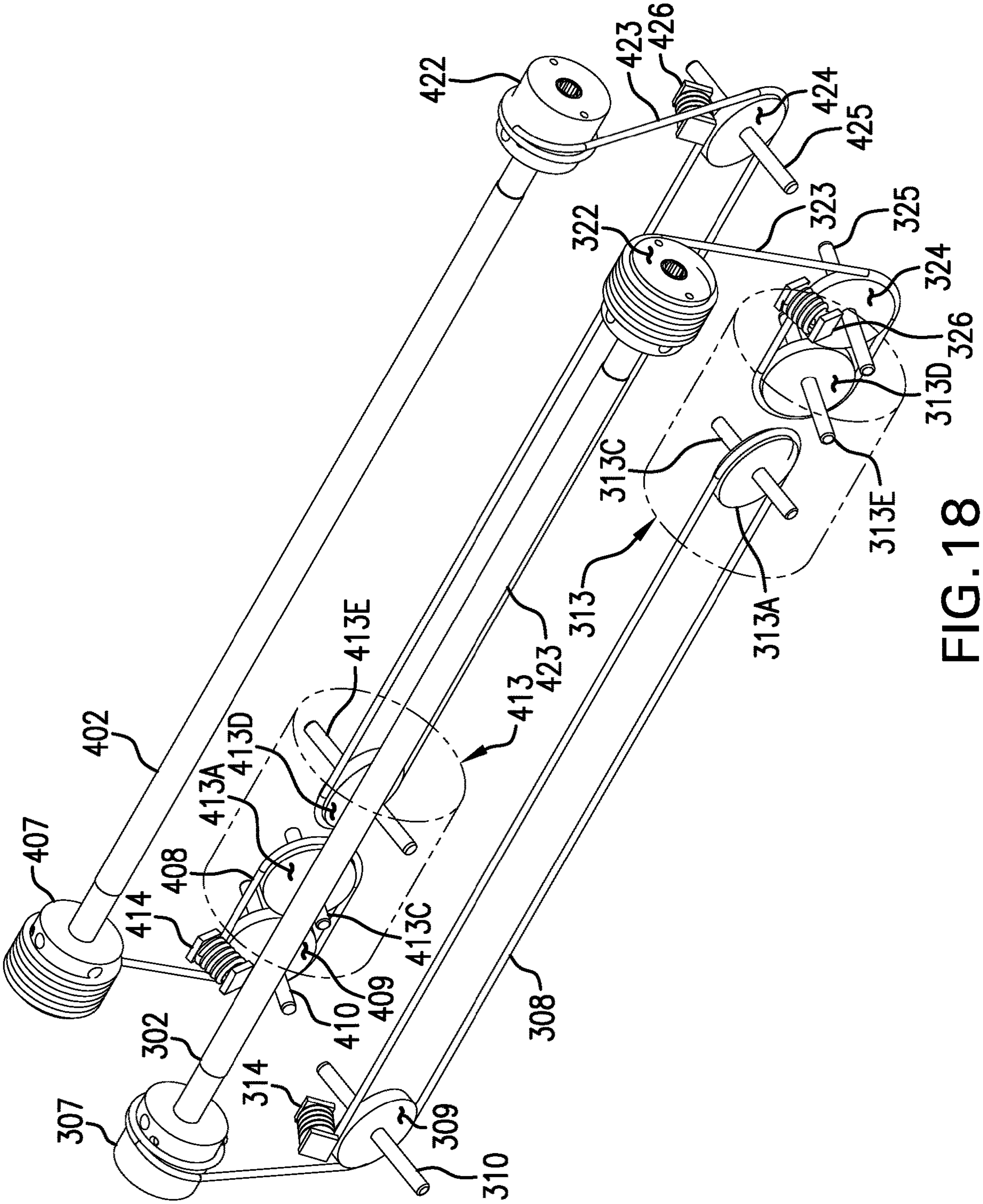
FIG. 18 shows an isometric view of a piston movement system of the remote drive of FIG. 13.

Referring now to FIG. 18, the cable system that moves piston assembles 313 and 413 is shown. Although not shown in FIG. 18, it is understood that timing belt 206 will simultaneously rotate timing belt pulleys 301 and 401 and shafts 302 and 402 respectively, to which the pulleys 301, 401 are attached, as the output shaft of motor 201 rotates (see also FIG. 14). As motor 201 rotates shafts 302 and 402 clockwise (CW), additional turns of cable 308 will be wound around drum 307, shortening the length of cable 308 spanning between pulley 309 and pulley 313A and between pulley 313A and anchor 314. Reduction of cable 308 spans exert a force, equal to twice the tension in cable 308, against pulley 313A which causes piston assembly 313 to move in a direction towards pulley 309. As shaft 302 and drum 307 rotate CW, drum 322 on the opposing end of shaft 302 simultaneously rotates CW, extending the length of cable 323 spanning between pulley 324 and pulley 313D as piston assembly 313 moves away from pulley 324. The outer diameters of drums 307 and 322 are chosen to be identical so that the additional amount of cable 308 wound upon drum 307 will always be equal to the amount of cable 323 released from drum 322. In analogous manner, as shaft 402 rotates CW, additional turns of cable 423 will be wound around drum 422, shortening the length of cable 423 spanning between pulley 424 and pulley 413D and between pulley 413D and anchor 426. Reduction of the cable 423 spans exert a force, equal to twice the tension in cable 423, against pulley 413D which causes piston assembly 413 to move in a direction towards pulley 424. As shaft 402 and drum 422 rotate CW, drum 407 on the opposing end of shaft 202 simultaneously rotates CW, extending the length of cable 408 spanning between pulley 409 and pulley 413A as piston assembly 413 moves away from pulley 409. The outer diameters of drums 407 and 422 are chosen to be identical so that the additional amount of cable 423 wound upon drum 422 will always be equal to the amount of cable 408 released from drum 407.

It will be apparent to one skilled in the art that as motor 201 rotates shafts 302 and 402 counterclockwise (CCW), the motions of piston assemblies 313 and 413 will be reversed, with piston assembly 313 moving away from pulley 309 as piston assembly 413 moves toward pulley 409 under the action of the force applied by the two spans of cable 408 against pulley 413A.

Figure 19:
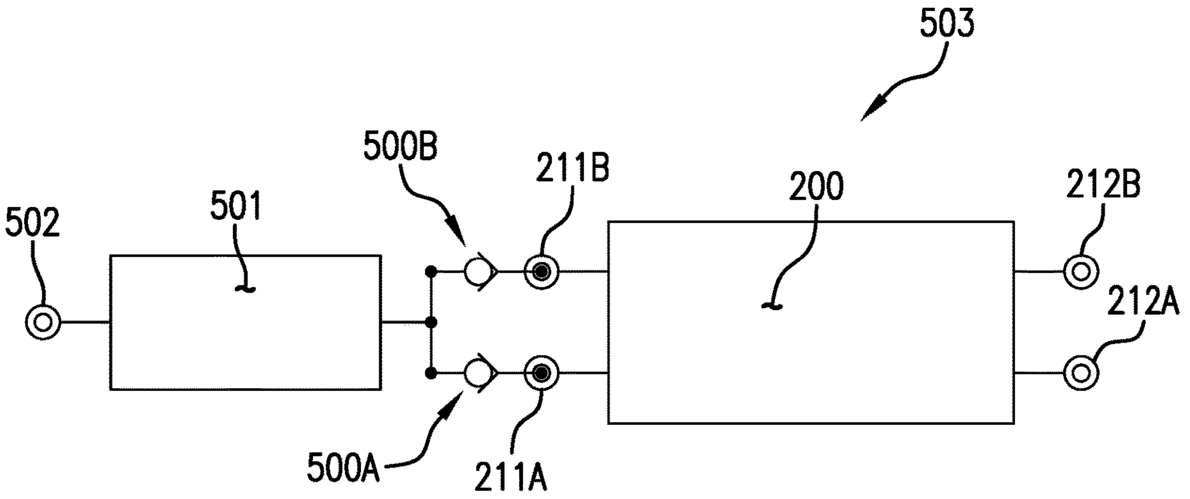
FIG. 19 shows a schematic of another embodiment of a drive system, which includes the remote drive of FIG. 13 and which is configured to provide a source of pressurized air to an external pneumatic circuit, in accordance with an exemplary embodiment of the present invention.

Referring now to FIG. 19, there is shown another embodiment of a drive system, namely, drive system 503, which includes remote drive 200, storage container 501 (which can be a reservoir or an accumulator but is assumed to be a reservoir herein), check valves 500A, 500B, and ports 211A, 211B, 212A, 212B, and port 502 (drive system 503 further includes an actuator (not shown) that is actuated by remote drive 200). FIG. 19 shows the application of the remote drive 200 of FIG. 13 to provide a source of pressurized air. Ports 211A and 211B of remote drive 200 are connected through check-valves 500A and 500B respectively, such as those manufactured by the Check-All Company, to reservoir 501. Storage container 501 is configured for storing a fluid medium, such as air, therein. Storage container 501 and check valves 500A, 500B are fluidically coupled with remote drive 200. In operation, remote drive 200 is cycled to alternately produce compressed air from ports 211A and 211B. When the compressed air produced at port 211A exceeds a selected pressure, check valve 500A opens, allowing compressed air to flow from the remote drive 200 into reservoir 501. Alternately, when the compressed air produced at port 211B exceeds a selected pressure, check valve 500B opens, allowing compressed air to flow from the remote drive 200 into reservoir 501. Port 502, attached to reservoir 501 allows the compressed air within the reservoir to be connected to an external pneumatic circuit (not shown). In this manner, cyclical operation of remote drive 200 results in a continuous flow of ambient air drawn into ports 212A and 212B exiting as compressed air from ports 211A and 211B, respectively, to maintain a supply of compressed air within reservoir 501. This embodiment of the present invention thus replaces a pneumatic coupling between the remote drive 200 and the driven actuator with an accumulator or reservoir 501 in which a volume of air is stored after being compressed to a specified pressure by the action of the remote drive 200.

Figure 20:
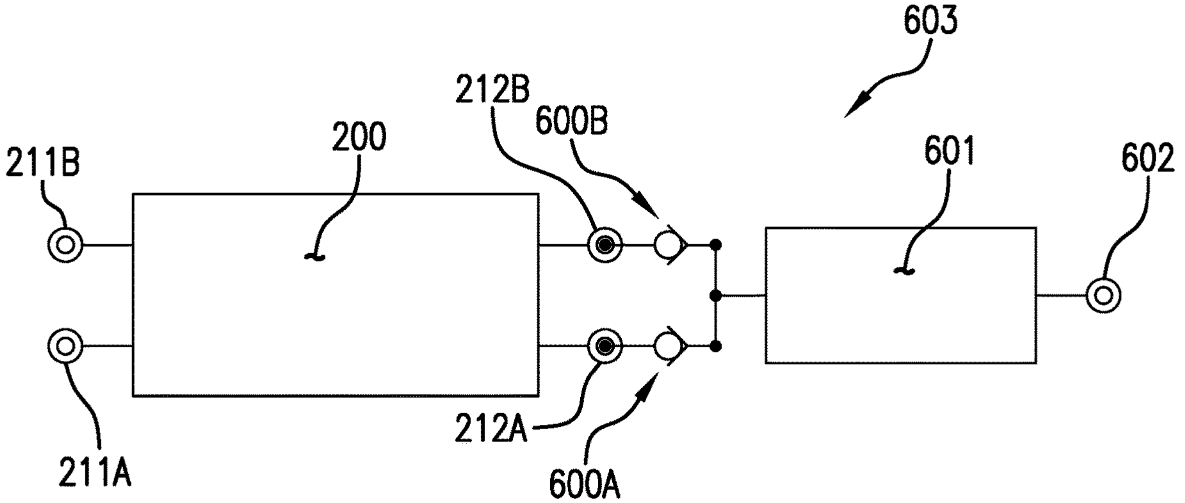
FIG. 20 shows a schematic of yet another embodiment of a drive system, which includes the remote drive of FIG. 13 and which is configured to provide a source of rarified air (i.e. a partial vacuum) to an external pneumatic circuit, in accordance with an exemplary embodiment of the present invention.

Referring now to FIG. 20, there is shown another embodiment of a drive system, namely, drive system 603, which includes remote drive 200, storage container 601 (which can be a reservoir or an accumulator but is assumed to be a reservoir herein), check valves 600A, 600B, and ports 211A, 211B, 212A, 212B, and port 602. FIG. 20 shows the application of the remote drive 200 of FIG. 13 to provide a source of rarified air (i.e. a partial vacuum). Ports 212A and 212B are connected through check-valves 600A and 600B respectively, such as those manufactured by the Check-All Company, to reservoir 601. Storage container 601 is configured for storing a fluid medium, such as rarefied air, therein. Storage container 601 and check valves 600A, 600B are fluidically coupled with remote drive 200. In operation, remote drive 200 is cycled to alternately produce rarified air from ports 212A and 212B. When the rarified air produced at port 212A subceeds a selected level of partial vacuum, check valve 600A opens, allowing air to flow from reservoir 601 into the remote drive 200. Alternately, when the rarified air produced at port 212B subceeds a selected level of partial vacuum, check valve 600B opens, allowing air to flow from reservoir 601 into the remote drive 200. Port 602, attached to reservoir 601, allows the partial vacuum within the reservoir 601 to be connected to an external pneumatic circuit (not shown). In this manner, cyclical operation of remote drive 200 results in a continuous flow of rarefied air drawn into ports 212A and 212B as ambient pressure air exits from ports 211A and 211B, respectively, to maintain a partial vacuum within reservoir 601. This embodiment of the present invention thus replaces the pneumatic coupling between the remote drive 200 and the driven actuator with an accumulator or reservoir 601 in which a volume of rarified air is stored after being evacuated to a specified partial vacuum by the action of the remote drive 200. Accordingly, drive system 603, which is operated to produce a partial vacuum, further includes an actuator (not shown) that is actuated by remote drive 200 and is coupled with port 602; this actuator is configured for employing at least a partial vacuum and thus, according to an embodiment of the present invention, is a suction cup configured for grasping a workpiece when the suction cup is evacuated to exert a force against the workpiece to be grasped.

Figure 21:
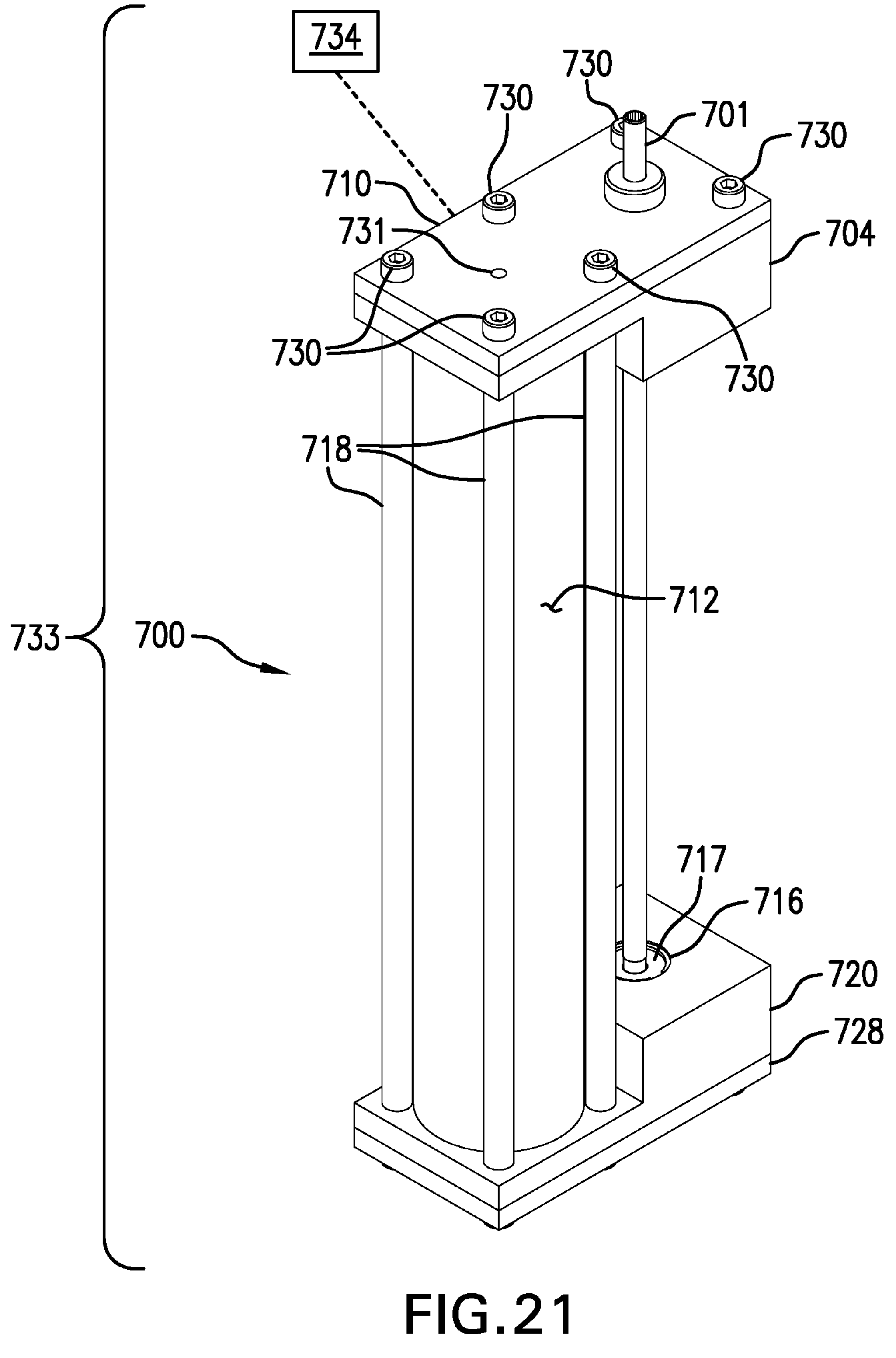
FIG. 21 shows another embodiment of a drive system including a pneumatically powered, cable driven rotary actuator based on the cylinder assembly of FIG. 16, in accordance with an exemplary embodiment of the present invention.
Figure 22:
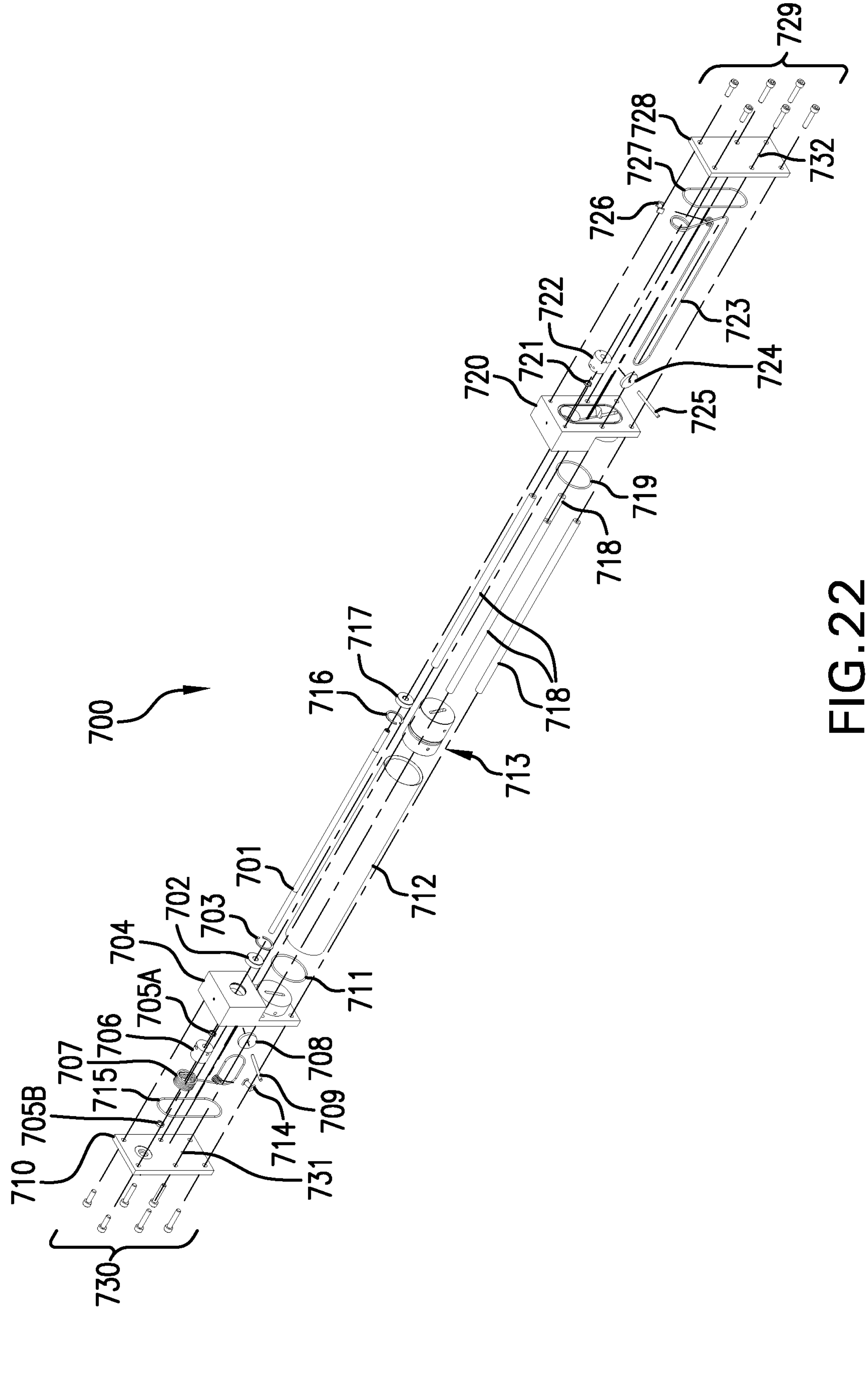
FIG. 22 shows an exploded isometric view of the cable driven rotary actuator of FIG. 21.
Figure 23:
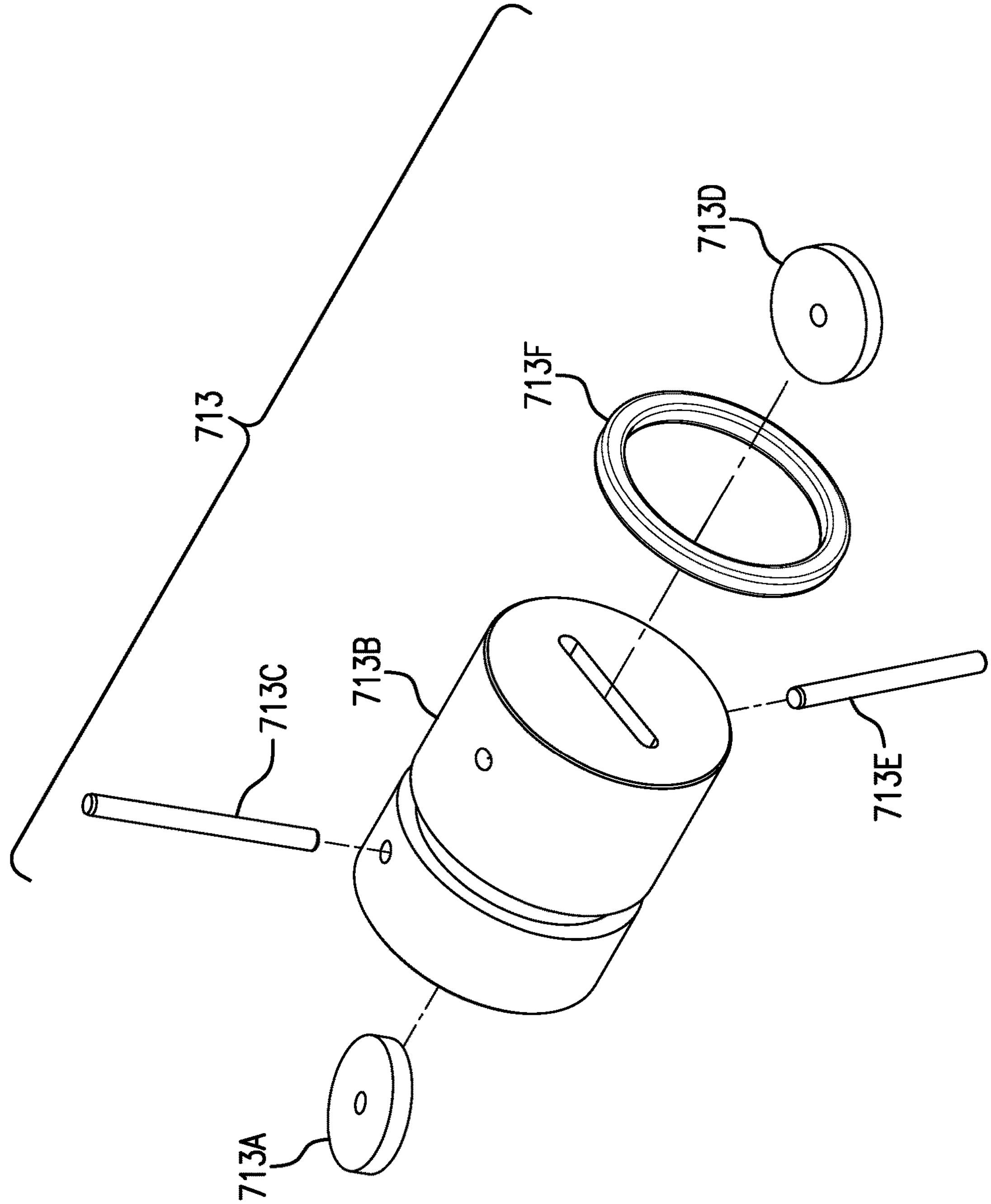
FIG. 23 shows an exploded view of the piston assembly 713 shown in FIG. 22.
Figure 24:
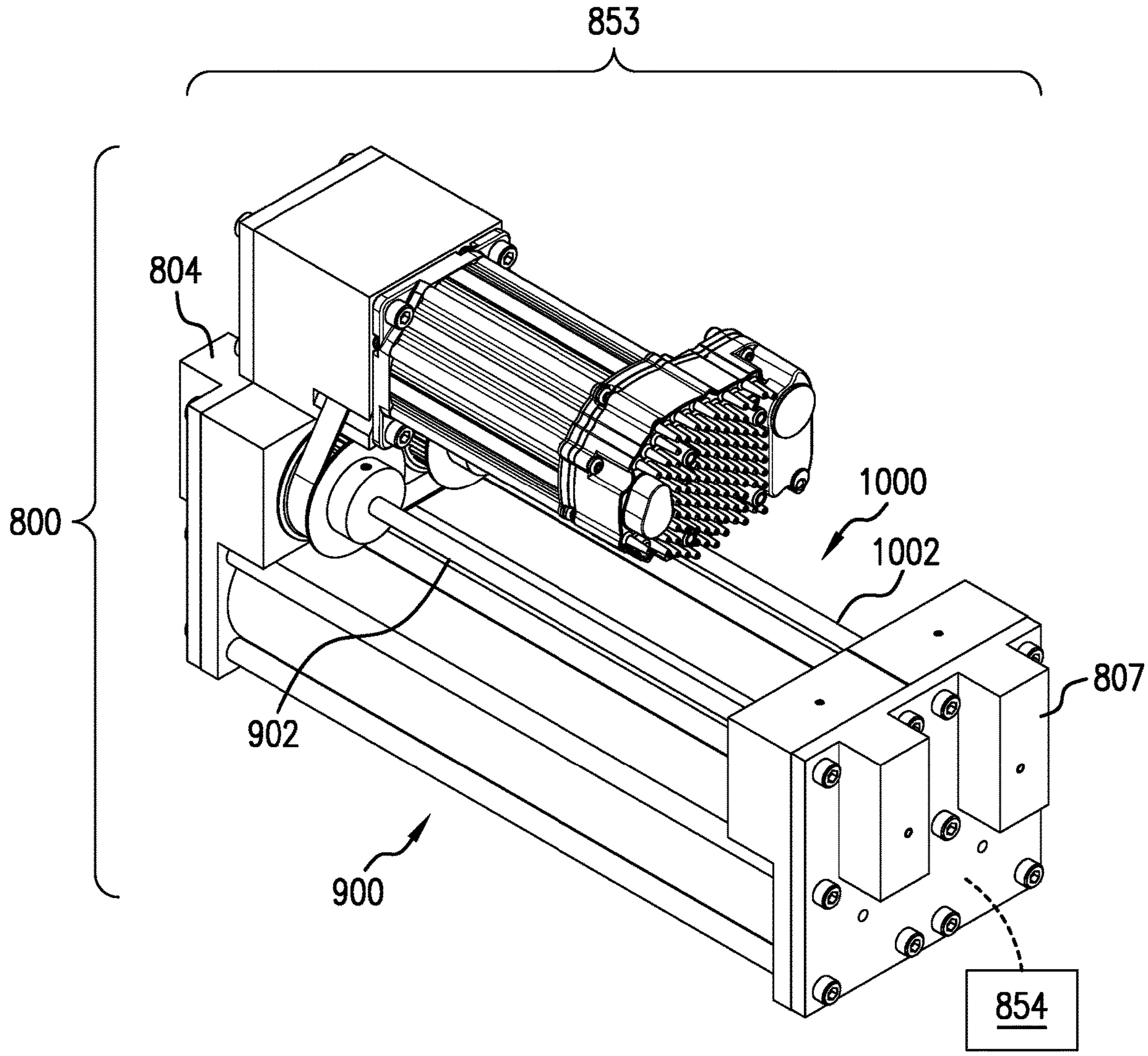
FIG. 24 shows an isometric view of yet another embodiment of a remote drive of a drive system, the remote drive using air as the working fluid and being in part similar to the remote drive of FIG. 13, in accordance with an exemplary embodiment of the present invention.
Figure 25:
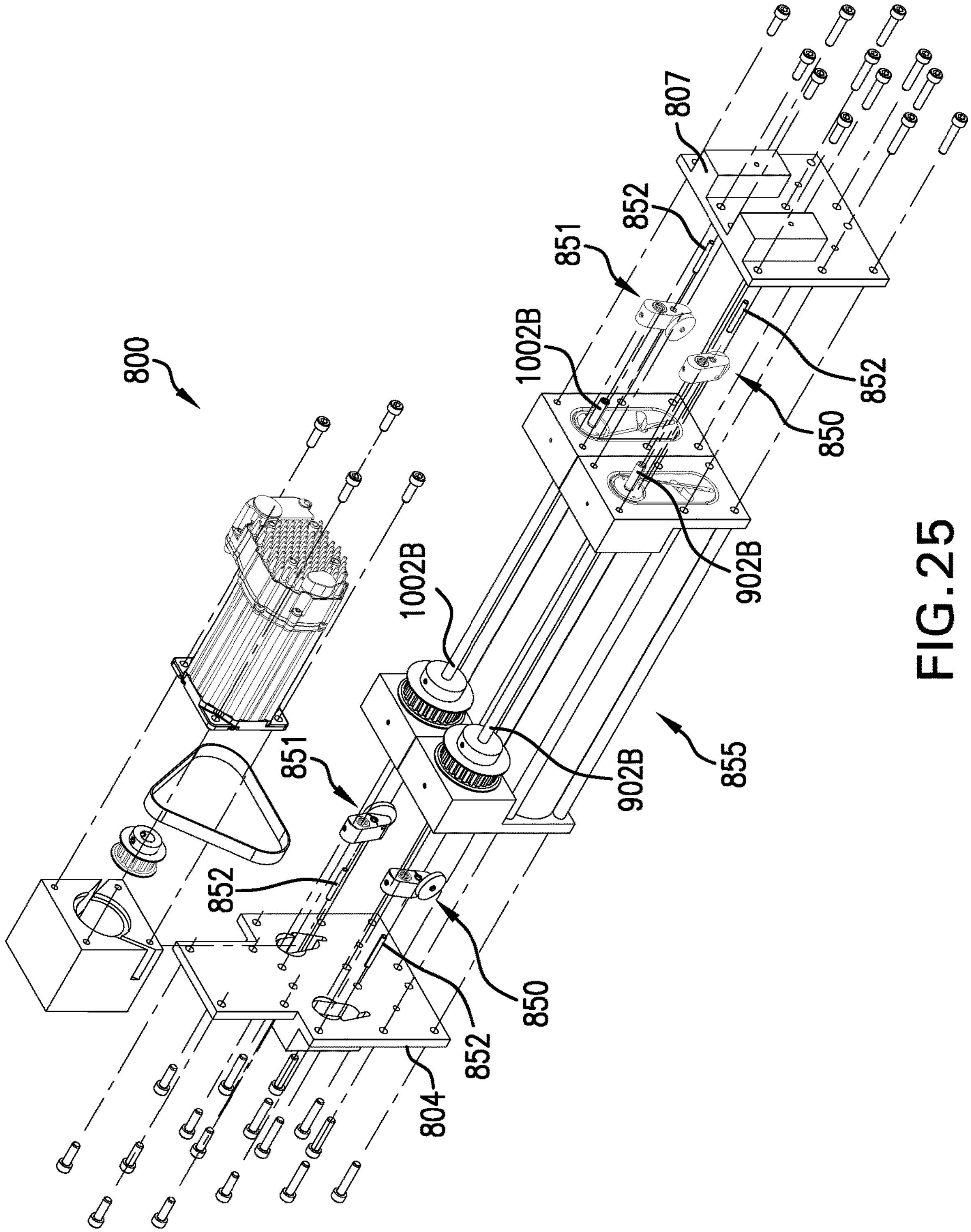
FIG. 25 shows a partially exploded isometric view of the remote drive of FIG. 24.

Referring now to FIGS. 21-23, there is shown another embodiment the drive system according to the present invention, namely, drive system 733, drive system 733 including a remote drive 734 (schematically shown) according to the present invention (such as remote drives 1, 100, 200), and an actuator according to an embodiment of the present invention, namely, actuator 700. Actuator 700 is a pneumatically powered cable driven rotary actuator 700 according to the present invention. This embodiment of the actuator is an adaptation of remote drives 100 and/or 200 to form an actuator 700 wherein a source of compressed air is used to convert the linear motion of an internal piston (piston assembly 713) into an externally accessible rotational motion provided by a drive shaft (drive shaft 701) in order to drive a downstream device (see FIGS. 15-16 and 22, wherein actuator 700 is structurally similar to cylinder assemblies 300/400). Actuator can be a part of a drive system 733, which further includes a supply of a fluid medium which is compressed or otherwise pressurized, such as compressed air. Actuator 700 includes, respectively, drive shaft 701, radial bearing 702, retaining ring 703, end block 704, radial seals 705A, 705B, drum 706, cable 707, cable pulley 708, pivot pin 709, cover 710, O-ring seal 711, cylinder tube 712, piston assembly 713, anchor 714, seal 715, retaining ring 716. Radial bearing 717, tierods 718, O-ring seal 719, end block 720, radial seal 721, cable drum 722, cable 723, cable pulley 724, pivot pin 725, anchor 726, seal 727, end cover 728, fasteners 729, 730, and ports 731, 732. Piston assembly 713 includes cable pulley 713A, piston 713B, pivot pin 713C, cable pulley 713D, pivot pin 713E, and seal 713F. Piston assembly 713, cables 707, 723, and drive shaft 701 are coupled with one another, piston assembly 713 and cables 707, 723 together being configured for causing drive shaft 701 to rotate. In general, to move shaft 701 CW, air moves into cylinder tube 712 by way of port 731, which moves piston assembly 713 to the right in FIG. 22, causing cable 707 to unwind and drum 706 to move CW, which moves shaft 701 CW, which also moves drum 722 CW, causing cable 723 to wrap around drum 722. To move shaft 701 CCW, air moves into cylinder tube 712 by way of port 732, which pushes piston assembly 713 to the left in FIG. 22, causing cable 723 to unwind and drum 722 to move CCW, which moves shaft 701 CCW, which also moves drum 706 CCW, causing cable 707 to wrap around drum 706. One end of drive shaft 701 passes though radial bearing 702, with bearing 702 retained by retaining ring 703 within a complementary bore in end block 704. The end of shaft 701 then passes through radial seal 705A, disposed in a complementary bore in block 704 so as to prevent air from passing between the shaft and block, and into cable drum 706, with setscrews (not shown) securing drum 706 onto the end of shaft 701. Shaft 701 then passes through radial seal 705B, disposed in a complementary bore in cover 710 so as to prevent air from passing between shaft 701 and cover 710 and out of cover 710 so as to allow a mechanical connection of shaft 701 to an external component (not shown) to be rotated. One end of cable 707 passes through a hole in drum 706, with a plurality of turns of cable 707 wound around the periphery of drum 706. Cable 707 may take the form of steel wire rope or be constructed from suitable polymer threads woven or braided together. Cable 707 is directed from the windings about drum 706 to wrap around the outer diameter of cable pulley 708, which is retained in a complementary slot in end block 704 by, and is free to pivot about, pivot pin 709 which is disposed in a complementary hole in the protruding boss of block 704. Cable 707 passes through block 704, O-ring seal 711 and cylinder tube 712 to engage cable pulley 713A, which is retained in a complementary slot in piston 713B by, and is free to pivot about, pivot pin 713C which is disposed in a complementary hole in piston 713B (see FIG. 23). O-ring seal 711 seals the end of tube 712 against the face of end block 704 to prevent the egress of compressed air from the end of tube 712. Cable 707 continues around the periphery of pulley 713A and returns through tube 712, seal 711, and block 704 to terminate with a plurality of turns of cable 707 wound around the periphery of capstan anchor 714 before passing through a complementary hole in anchor 714. Anchor 714 is disposed in a complementary groove in block 704 to prevent both rotation and translation of anchor 714. The turns of cable 707 about the body of anchor 714 exploit the so-called capstan effect, wherein any tension applied to cable 707 is progressively reduced by friction between the surface of cable 707 and the surface of anchor 714 as additional turns of cable 707 are added. This reduces the tension applied to cable 707 by the action of pulley 713A acting upon cable 707 to a level sufficient to retain the end of cable 707 within the hole in anchor 714 through which cable 707 passes. In an analogous manner, the turns of cable 707 wound about cable drum 706 also exploit the capstan effect to retain the opposing end of cable 707 within the complementary cable hole in the drum 706. Seal 715 seals against the face of end cover 710 to prevent the egress of compressed air from the block 704 through other than threaded port 731. Seal 713F seals the periphery of piston 713B against the inner diameter of cylinder tube 712. Further, threaded fasteners 729, 730 attach end covers 728, 710 to end blocks 720, 704, respectively.

The opposing end of drive shaft 701 passes though radial bearing 717, with the bearing retained by retaining ring 716 within a complementary bore in end block 720. The end of shaft 701 then passes through radial seal 721, disposed in a complementary bore in block 720 so as to prevent air from passing between shaft 701 and block 720, and into cable drum 722, with setscrews (not shown) securing drum 722 onto the end of shaft 701. One end of cable 723 passes through a hole in drum 722, with a plurality of turns of cable 723 wound around the periphery of drum 722. Cable 723 may take the form of steel wire rope or be constructed from suitable polymer threads woven or braided together. Cable 723 is directed from the windings about drum 722 to wrap around the outer diameter of cable pulley 724, which is retained in a complementary slot in end block 720 by, and is free to pivot about, pivot pin 725 which is disposed in a complementary hole in the protruding boss of block 720. Cable 723 passes through block 720, O-ring seal 719, and cylinder tube 712 to engage cable pulley 713D (FIG. 23), which is retained in a complementary slot in inner piston 713B by, and is free to pivot about, pivot pin 713E which is disposed in a complementary hole in piston 713B. O-ring seal 719 seals the opposing end of tube 712 against the face of end block 720 to prevent the egress of compressed air from the end of tube 712. Cable 723 continues around the periphery of pulley 713D and returns through tube 712, seal 719, and block 720 to terminate with a plurality of turns of cable 723 wound around the periphery of capstan anchor 726 before passing through a complementary hole in anchor 726. Anchor 726 is disposed in a complementary groove in block 720 to prevent both rotation and translation of anchor 726. The turns of cable 723 about anchor 726 and drum 722 exploit the capstan effect to allow the complementary cable holes in anchor 726 and drum 722 to retain the respective ends of cable 723. Seal 727 seals against the face of end cover 728 to prevent the egress of external compressed air from block 720 through other than threaded port 732. Tierods 718 surround tube 712 to mechanically join together end blocks 704 and 720.

During operation of the rotary actuator 700, compressed air is directed into the volume formed by end block 704, tube 712, and movable piston 713 though the threaded port hole 731 in cover 710. The compressed air, acting on the face of piston 713 closest to block 704, creates a force acting to push piston 713 away from block 704. As piston 713 moves away from block 704, a proportional force is applied to cable 707 to rotate drum 706 clockwise (CW) removing turns of cable 707 from drum 706 as drum 706 rotates. Drum 706, which is mechanically attached to shaft 701, correspondingly rotates shaft 701 CW. As compressed air is applied to port 731, the air within the volume formed by piston 713, tube 712, and opposing end block 720 is simultaneously exhausted through threaded port 732 in opposing cover 728. The rotation of shaft 701 induces a corresponding CW rotation of opposing drum 722, which is mechanically attached to shaft 701. The CW rotation of drum 722 winds turns of cable 723 upon drum 722 at the same rate as the lengths of cable 723 spanning between pulley 713D within piston 713 and anchor 726 and between pulley 713D and drum 722 are shortened by the translation of piston 713.

To rotate shaft 701 in a counterclockwise (CCW) direction, compressed air is directed into the volume formed by end block 720, tube 712, and movable piston 713 though the threaded port hole 732 in cover 728. The compressed air, acting on the face of piston 713 closest to block 720, creates a force acting to push piston 713 away from block 720. As piston 713 moves away from block 720, a proportional force is applied to cable 723 to rotate drum 722 counterclockwise (CCW) removing turns of cable 723 from drum 722 as drum 722 rotates. Drum 722, which is mechanically attached to shaft 701, correspondingly rotates shaft 701 CCW. As compressed air is applied to port 732, the air within the volume formed by piston 713, tube 712, and end block 704 is simultaneously exhausted through threaded port 731 in opposing cover 710. The rotation of shaft 701 induces a corresponding CCW rotation of drum 706, which is mechanically attached to shaft 701. The CCW rotation of drum 706 winds turns of cable 707 upon drum 706 at the same rate as the lengths of cable 707 spanning between pulley 713A within piston 713 and anchor 714 and between pulley 713A and drum 706 are shortened by the translation of piston 713.

Referring now to FIGS. 24-28, there is shown another embodiment the drive system according to the present invention, namely, drive system 853, drive system 853 including another embodiment of the remote drive according to the present invention, namely, remote drive 800, and an actuator 854. Remote drive 800 includes the embodiment of the remote drive 200 (see FIGS. 13 and 14) with additional ways to guide cables 308, 323, 408, and 423 (see FIGS. 15 and 16) as they are wound and unwound about drums 307, 322, 407, and 422, respectively. Remote drive 800 is substantially similar in construction to remote drive 200, with the exception for instance of covers 804 and 807 substituting for covers 204 and 207, respectively, and cylinder assemblies 900 and 1000 substituting for cylinder assemblies 300 and 400, respectively. Remote drive 800 additionally incorporates dowel pins 852 and cable guide assemblies 850/851 (see also FIG. 26). Thus, remote drive 800 includes a motor (shown but unnumbered) and a belt (shown but unnumbered) which is driven by the motor and which drives shafts 902 and 1002. Further, remote drive 800 includes covers 804 (including cavities 804A, 804B), 807, cable guide assemblies 850, 851, dowl pin 852, cylinder assemblies 900, 1000, drums 907, 1007, cables 908, 1008, drums 922, 1022, cables 923, 1023, and piston assemblies 913, 1013. Cable guide assembly 850 includes guide body 850A, nut 850B, internal thread 850C, dowel pin 850D, pulley 850E, busing 850F, and set screws 850G. Cable guide assembly 851 is substantially similar to cable guide assembly 850 (unless otherwise shown or stated herein) and thus also includes nut 851B and pulley 851E. Shafts 902, 1002 include, respectively, threaded ends 902A, 1002A, 902B, 1002B. Further, remote drive 800 includes a cable and pulley system 855, piston assemblies 913, 1013 being coupled with cable and pulley system 855. Cable and pulley system 855 includes cables 908, 1008, 922, 1022 and cable guide assemblies 850, 851

(structure overlapping between cable and pulley system 855 and piston assemblies 913, 1013 can be regarded as being a part of cable and pulley system 215 or piston assemblies 313, 413). Piston assemblies 913, 1013 are substantially similar to piston assemblies 313, 413 (unless otherwise shown or stated herein), and thus piston assemblies 913, 1013 also include inner pistons and outer pistons which are configured for sliding relative to one another and thereby for selectively opening and closing a working medium passage therebetween (see FIGS. 9-12, for, the structure, function, and operation of working medium passage 129 of piston assemblies 313, 413 are substantially similar to those of working medium passage 129 of piston assemblies 114, 115). In general, the motor of remote drive 800 moves the belt, which rotates drive shafts 902, 1002 and drums 907/1007, 922/1022, causing spans of cables 908/1008 and 923/1023 to lengthen or shorten, which causes piston assemblies 913, 1013 (with slots and pins substantially similar to slots 313G, 413G and pins 313C, 413C) to translate within respective tubes, which causes air to flow in or out of ports (which are substantially similar to ports 211A/211B, 212A/212B), so as to move a working device thereby, such as an actuator similar to actuator 2. This embodiment of the remote drive thus provides an adaptation of remote drive 200 to add a way to guide the cables 908, 923, 1008, 1023 of the cable and pulley system as the cables 908, 923, 1008, 1023 are wound respectively around drums 907, 922, 1007, 1022 to convert the rotational motion from the electric motor into linear motion of the piston assemblies 913, 1013 fluidically coupled to a pneumatically driven actuator.

Figure 26:
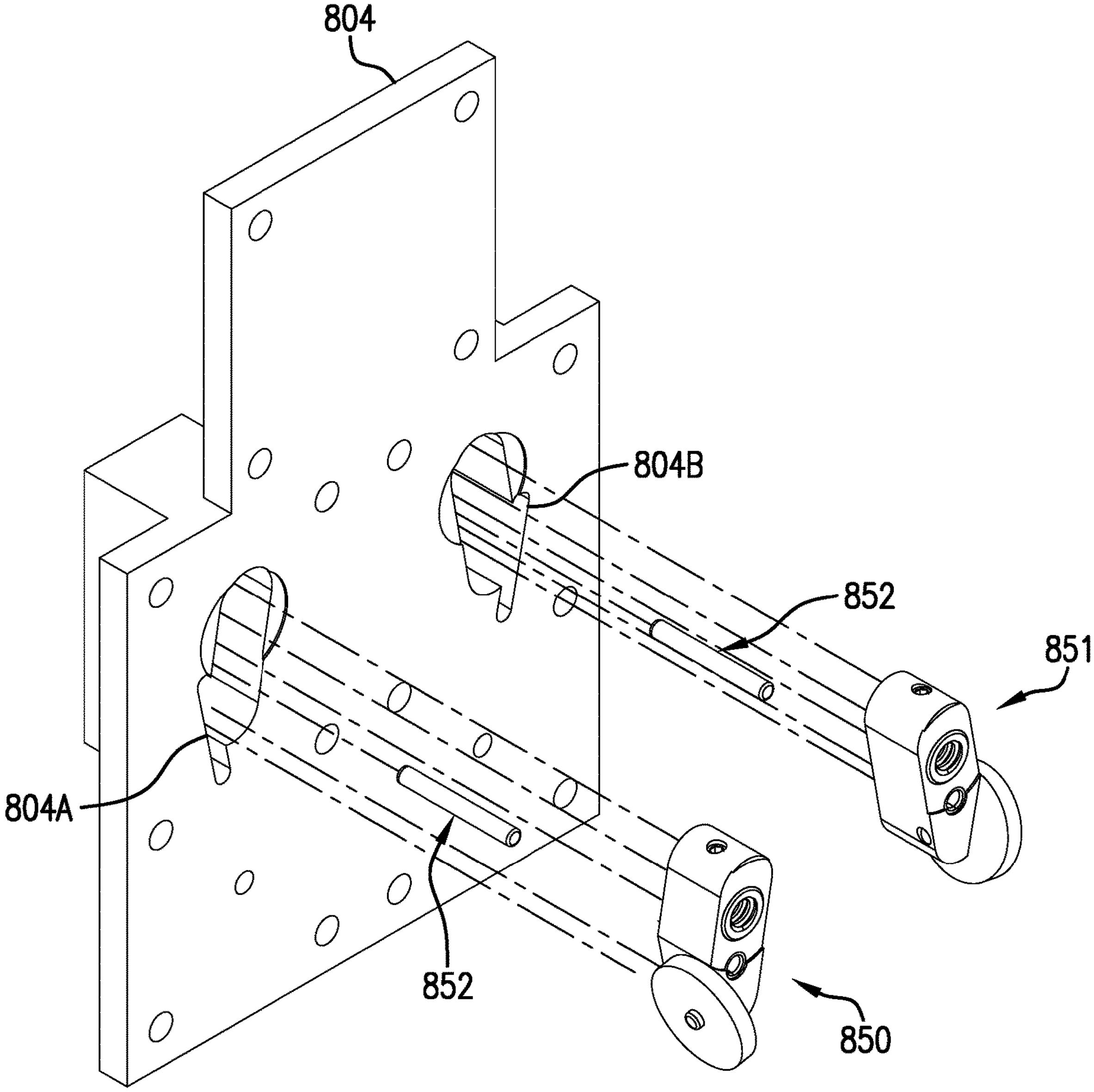
FIG. 26 shows an exploded isometric view of end cap 804 and cable guide assemblies 850/851 of FIG. 25.
Figure 27:
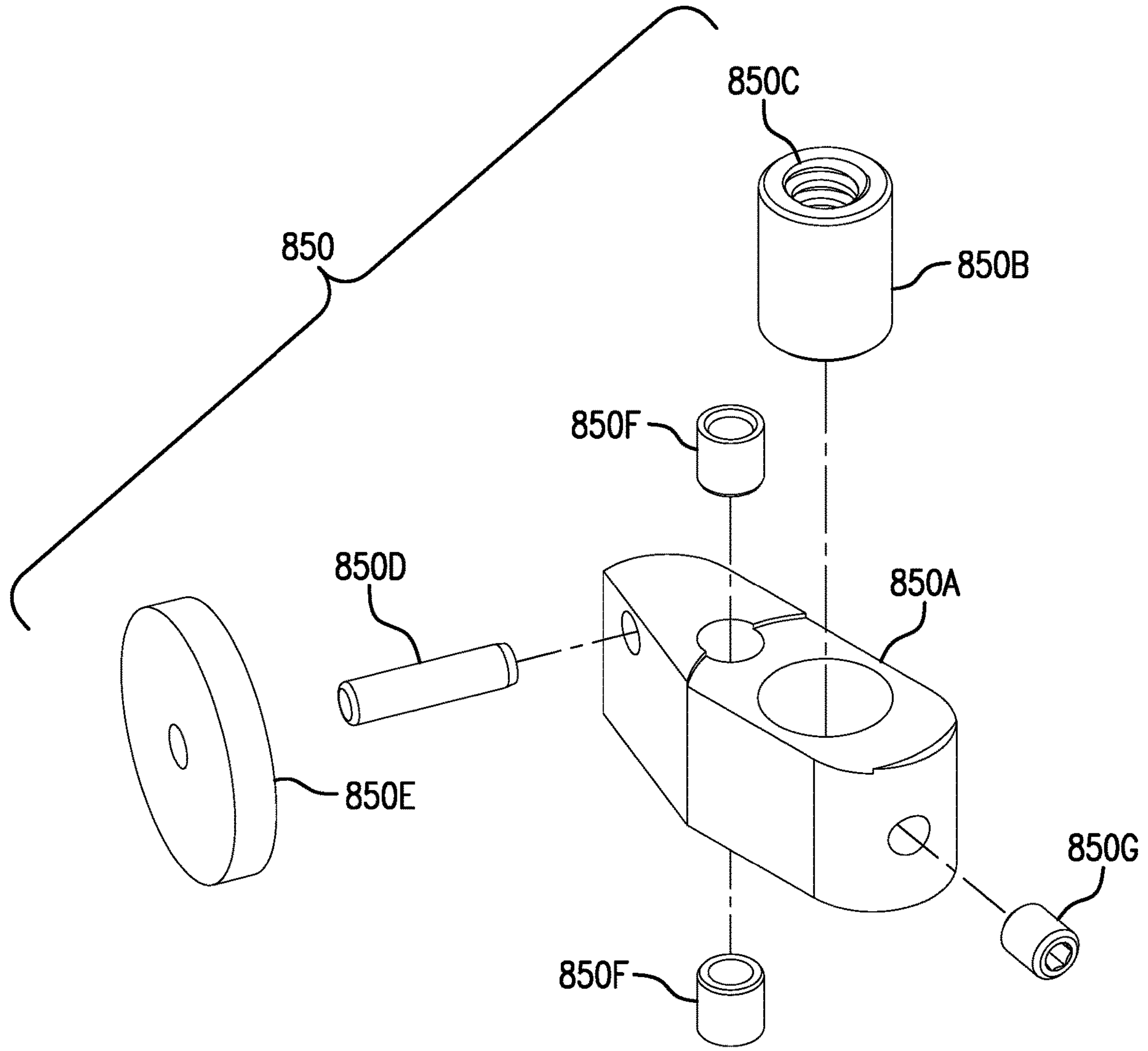
FIG. 27 shows an exploded isometric view of cable guide assembly 850 of FIG. 26.

Referring now to FIGS. 26 and 27, dowel pins 852 are press-fit into complementary bores (not shown) in cavities 804A/804B. Cable guide assemblies 850 and 851 are slidably deposed into complementary cavities 804A and 804B, respectively, around the protruding portions of dowel pins 852.

Figure 28:
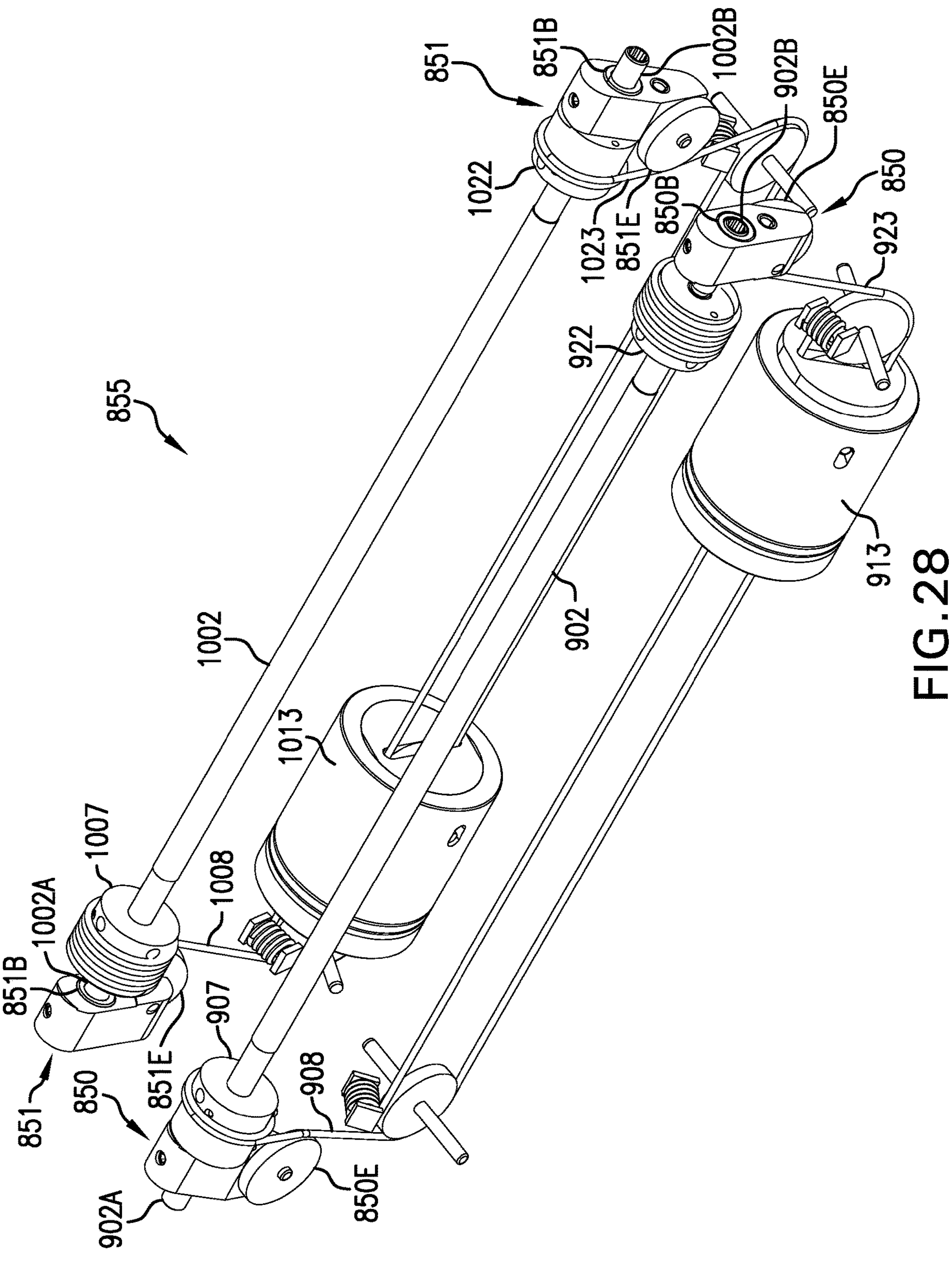
FIG. 28 shows an isometric view of a piston movement system of the remote drive of FIG. 24.

Referring now to FIGS. 27 and 28, bushings 850F, which are press-fit into a complementary bore in guide body 850A, slidably engage dowel pin 852 to prevent the cable guide assembly 850 from pitching about the longitudinal axis of the dowel pin 852, while allowing the cable guide assembly 850 to freely traverse the length of the dowel pin 852. The slidable engagement of guide body 850A within the confines of cavity 804A (see also FIG. 26) prevents cable guide assembly 850 from rotating about dowel pin 852, while allowing the cable guide assembly 850 to freely traverse the length of cavity 804A. In a similar manner, bushings (not shown), press-fit into a complementary bore in guide body 851 and slidably engage dowel pin 852 to prevent the cable guide assembly 851 from pitching about the longitudinal axis of the dowel pin 852, while allowing the cable guide assembly 851 to freely traverse the length of the dowel pin 852. The slidable engagement of cable guide assembly 851 within the confines of cavity 804B (see also FIG. 26) prevents the cable guide assembly 851 from rotating about dowel pin 852, while allowing the cable guide assembly 851 to freely traverse the length of cavity 804B. It is understood that cover 807 also contains press-fit dowel pins 852 and cavities (not shown) of identical geometry to those of cavities 804A and 804B, which slidably engage guide assemblies 850 and 851 to prevent pitching of the guide assemblies 850, 851 about the longitudinal axes of the dowel pins 852 and restrict rotation of guide assemblies 850, 851 about the dowel pins 852.

Dowel pin 850D is press-fit into a complementary hole in guide body 850A. A complementary hole in pulley 850E engages dowel pin 850D in a manner that allows pulley 850E to freely rotate about the dowel pin 850D. Nut 850B, containing internal thread 850C, slip-fits into a complementary bore in guide body 850A and is retained after insertion into the bore by setscrew 850G which passes through a threaded complementary hole in guide body 850A. This arrangement between nut 850B and guide body 850A allows the nut 850B to be threaded onto complementary thread 902B present on the end of drive shaft 902 (see also FIG. 26). Once the nut 850B has been installed onto threaded portion 902B of shaft 902 to the desired location, guide assembly 850 is placed onto the nut 850B, and setscrew 850G is tightened to retain the guide assembly 850 onto the nut 850B. In an analogous manner, a second nut 850B is threaded onto complementary thread 902A (see FIG. 28) placed on the end of shaft 902, opposite thread 902B, and a second guide assembly 850 is similarly retained on the nut 850B.

Referring now to FIG. 28, cable guide pulley 850E rests against the surface of cables 908/923 with the position of the cable 908, 923 relative to drums 907/922 determined by the location of guide assembly 850. Thread 850C (see FIG. 27) is selected to be a right-hand thread on both of the nuts 850B which engage the threaded ends 902A/902B of shaft 902. The pitch of thread 850C is selected to be equal to, or slightly greater than, the diameters of cables 908/1008 and 923/1023. As shaft 902 is rotated CW during operation of remote drive 800, additional cable 908 is wound onto drum 907. Simultaneously, the action of thread 805C against thread 902A causes guide assembly 850 to move away from drum 907 at a rate governed by the pitch of the thread, so that as drum 907 rotates one turn, cable 908 is allowed to advance approximately one cable diameter as it winds upon drum 907. This action precludes any tendency of the turns of cable 908 to lay over top of one another as additional cable 908 is wound onto the drum 907. In a similar manner, CW rotation of shaft 902 also causes guide assembly 850 on the opposite end of shaft 902 to move toward drum 922, allowing for a controlled unwinding of cable 923 from drum 922.

It will be apparent to one skilled in the art that CCW rotation of shaft 902 produces an opposite effect, with the winding of cable 923 onto drum 922 controlled by the progressive translation of the corresponding guide assembly 850 away from drum 922 and the unwinding of cable 908 from drum 907 controlled by the progressive translation of the corresponding guide assembly 850 toward drum 907.

Cable guide assemblies 851 are identical in construction to guide assemblies 850, with the exception for instance that a left-handed thread is chosen for the thread (not shown) in nut 851B and complementary threads 1002A/1002B on the ends of shaft 1002. In an analogous manner to the operation of shaft 902, guide assembles 850, drums 907 and 922 and cables 908 and 923, CW rotation of shaft 1002 causes additional turns of cable 1023 to be wound about drum 1022, while guided and controlled by the action of pulley 851E acting against cable 1023, while cable 1008 is simultaneously unwound from drum 1007, while guided and controlled by the action of pulley 851E acting against cable 1008. CCW rotation of shaft 1002 causes additional turns of cable 1008 to be wound about drum 1007, while guided and controlled by the action of pulley 851E acting against cable 1008, while cable 1023 is simultaneously unwound from drum 1022, while guided and controlled by the action of pulley 851E acting against cable 1023.

Figure 29:
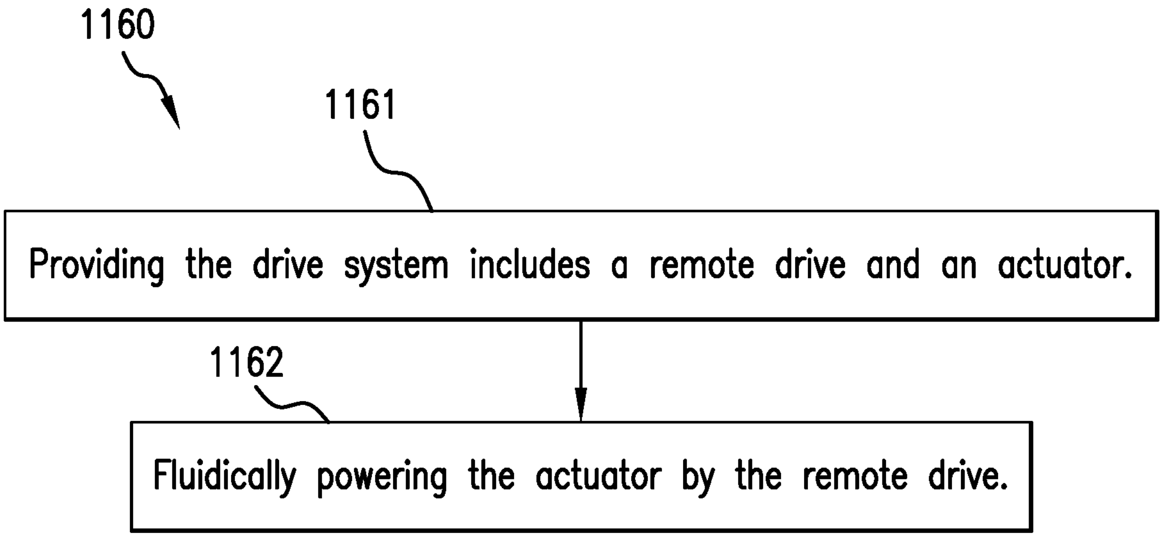
FIG. 29 illustrates a flow diagram showing a method of using a drive system, in accordance with an exemplary embodiment of the present invention.

Referring now to FIG. 29, there is shown a flow diagram showing a method 1160 of using a drive system 18, 126, 213, 503, 603, 733, 853, the method 1160 including the steps of:

providing 1161 that the drive system 18, 126, 213, 503, 603, 733, 853 includes a remote drive 1, 100, 200, 734, 800 and an actuator 2, 127, 214, 700, 854, the remote drive 1, 100, 200, 734, 800 being configured for being driven by an electrical motor 14, 101, 201, the actuator 2, 127, 214, 700, 854 being spaced apart from and fluidically coupled with the remote drive 1, 100, 200, 734, 800; and fluidically powering 1162 the actuator 2, 127, 214, 700, 854 by the remote drive 1, 100, 200, 734, 800. The remote drive 1, 100 can include a rack and pinion system 19, 128 and a plurality of piston assemblies 20A, 20B, 114, 115 coupled therewith, the plurality of piston assemblies 20A, 20B, 114, 115 each including an inner piston 114B, 115B and an outer piston 114D, 115D which are configured for sliding relative to one another and thereby for selectively opening and closing a working medium passage 129 therebetween. The remote drive 200 can include a cable and pulley system 215, 855 and a plurality of piston assemblies 313, 413 coupled therewith, the plurality of piston assemblies 313, 413 each including an inner piston 313B, 413B and an outer piston 313H, 413H which are configured for sliding relative to one another and thereby for selectively opening and closing a working medium passage 129 therebetween. The cable and pulley system 855 can further include a plurality of cable guide assemblies 850, 851. The drive system 213, 503, 603, 853 can further include a storage container 501, 601 and a plurality of check valves 500A, 500B, 600A, 600B, the storage container 501, 601 and the plurality of check valves 500A, 500B, 600A, 600B being fluidically coupled with the remote drive 200, the storage container 501, 601 being configured for storing a fluid medium therein, the fluid medium being air or rarified air. The actuator 700 can include a piston assembly 713, a plurality cables 707, 723, and a drive shaft 701 coupled with one another, the piston assembly 713 and the plurality of cables 707, 723 together being configured for causing the drive shaft 701 to rotate.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive system, comprising:

a remote drive configured for being driven by an electrical motor, wherein the remote drive includes a cable and pulley system and a plurality of piston assemblies coupled therewith, the plurality of piston assemblies each including an inner piston and an outer piston which are configured for sliding relative to one another and thereby for selectively opening and closing a working medium passage therebetween; and an actuator spaced apart from and fluidically coupled with the remote drive and configured for being fluidically powered by the remote drive.

2. The drive system according to claim 1, wherein the cable and pulley system further includes a plurality of cable guide assemblies.

3. The drive system according to claim 1, further including a storage container and a plurality of check valves, the storage container and the plurality of check valves being fluidically coupled with the remote drive, the storage container being configured for storing a fluid medium therein, the fluid medium being air or rarified air.

4. A drive system, comprising:

a remote drive configured for being driven by an electrical motor; and an actuator spaced apart from and fluidically coupled with the remote drive and configured for being fluidically powered by the remote drive, wherein the actuator includes a piston assembly, a plurality of cables, and a drive shaft coupled with one another, the piston assembly and the plurality of cables together being configured for causing the drive shaft to rotate.

5. A drive of a drive system, the drive comprising:

the drive, which is a remote drive that is configured for being driven by an electrical motor, is configured for being spaced apart and fluidically coupled with an actuator of the drive system, and is configured for fluidically powering the actuator, wherein the remote drive includes a cable and pulley system and a plurality of piston assemblies coupled therewith, the plurality of piston assemblies each including an inner piston and an outer piston which are configured for sliding relative to one another and thereby for selectively opening and closing a working medium passage therebetween.

6. The drive according to claim 5, wherein the cable and pulley system further includes a plurality of cable guide assemblies.

7. The drive according to claim 5, wherein the remote drive is configured such that the drive system further includes a storage container and a plurality of check valves such that the storage container and the plurality of check valves are fluidically coupled with the remote drive and the storage container is configured for storing a fluid medium therein, which is air or rarified air.

8. A drive of a drive system, the drive comprising:

the drive, which is a remote drive that is configured for being driven by an electrical motor, is configured for being spaced apart and fluidically coupled with an actuator of the drive system, and is configured for fluidically powering the actuator, wherein the remote drive is configured such that the actuator includes a piston assembly, a plurality of cables, and a drive shaft coupled with one another, such that the piston assembly and the plurality of cables together are configured for causing the drive shaft to rotate.

9. A method of using a drive system, the method comprising the steps of:

providing that the drive system includes a remote drive and an actuator, the remote drive being configured for being driven by an electrical motor, the actuator being spaced apart from and fluidically coupled with the remote drive, wherein the remote drive includes a cable and pulley system and a plurality of piston assemblies coupled therewith, the plurality of piston assemblies each including an inner piston and an outer piston which are configured for sliding relative to one another and thereby for selectively opening and closing a working medium passage therebetween; and fluidically powering the actuator by the remote drive.

10. The method according to claim 9, wherein the cable and pulley system further includes a plurality of cable guide assemblies.

11. The method according to claim 9, wherein the drive system further includes a storage container and a plurality of check valves, the storage container and the plurality of check valves being fluidically coupled with the remote drive, the storage container being configured for storing a fluid medium therein, the fluid medium being air or rarified air.

12. A method of using a drive system, the method comprising the steps of:

providing that the drive system includes a remote drive and an actuator, the remote drive being configured for being driven by an electrical motor, the actuator being spaced apart from and fluidically coupled with the remote drive, wherein the actuator includes a piston assembly, a plurality of cables, and a drive shaft coupled with one another, the piston assembly and the plurality of cables together being configured for causing the drive shaft to rotate; and fluidically powering the actuator by the remote drive.

* * * * *